(12) United States Patent
Li et al.

(10) Patent No.: US 12,232,187 B2
(45) Date of Patent: Feb. 18, 2025

(54) METHOD FOR UPLINK ORTHOGONAL FREQUENCY DIVISION MULTIPLE RANDOM ACCESS AND APPARATUS

(71) Applicant: Huawei Technologies Co., Ltd., Shenzhen (CN)

(72) Inventors: Yunbo Li, Shenzhen (CN); Yuchen Guo, Shenzhen (CN); Mao Yang, Xi'an (CN); Zhongjiang Yan, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 363 days.

(21) Appl. No.: 17/686,765

(22) Filed: Mar. 4, 2022

(65) Prior Publication Data
US 2022/0191923 A1    Jun. 16, 2022

Related U.S. Application Data

(63) Continuation of application No. PCT/CN2020/113625, filed on Sep. 4, 2020.

(30) Foreign Application Priority Data

Sep. 6, 2019    (CN) .......................... 201910843950.3

(51) Int. Cl.
     *H04W 74/0833*      (2024.01)
     *H04L 5/00*      (2006.01)
     (Continued)

(52) U.S. Cl.
     CPC ......... *H04W 74/085* (2013.01); *H04L 5/0007* (2013.01); *H04W 72/1263* (2013.01); *H04W 74/0866* (2013.01)

(58) Field of Classification Search
None
See application file for complete search history.

(56) References Cited

U.S. PATENT DOCUMENTS 10,904,927 B2    1/2021   Ko et al.
11,006,461 B2    5/2021   Huang et al.
(Continued)

FOREIGN PATENT DOCUMENTS

CN      108811169 A    11/2018
CN      109644447 A    4/2019
(Continued)

*Primary Examiner* — Yaotang Wang
(74) *Attorney, Agent, or Firm* — SLATER MATSIL, LLP

(57) ABSTRACT

A method and device for uplink orthogonal frequency division multiple access random access, the method including receiving, by a station (STA), a first trigger frame sent by an access point AP, the STA supporting n resource units RUs, where n>1 and is an integer, the first trigger frame including information used to determine a number k of random access resource units (RA-RUs) allocated by the AP, where k is an integer >0, and setting, by the STA, in response to the STA determining that a first parameter is greater than or equal to a value of an orthogonal frequency division multiple access (OFDMA) random access backoff (OBO) counter, the value of the OBO counter to 0, and randomly selecting, by the STA, i RA-RUs from the k RA-RUs to send uplink data, where i≤n, and where the first parameter is associated with k.

19 Claims, 18 Drawing Sheets

(51) Int. Cl.
 *H04W 72/1263* (2023.01)
 *H04W 74/08* (2024.01)

(56) References Cited

U.S. PATENT DOCUMENTS

| | | |
|---|---|---|
| 11,109,419 B2 | 8/2021 | Han et al. |
| 11,284,475 B2 | 3/2022 | Ko et al. |
| 2017/0289994 A1 | 10/2017 | Kim et al. |
| 2022/0338267 A1* | 10/2022 | Viger ................ H04W 74/0833 |

FOREIGN PATENT DOCUMENTS

| | | |
|---|---|---|
| CN | 110115093 A | 8/2019 |
| WO | 2017150041 A1 | 9/2017 |
| WO | 2018190697 A1 | 10/2018 |
| WO | WO-2019108097 A1 * | 6/2019 |

\* cited by examiner

| Frame control (Frame control) | Duration (Duration) | Receiver address (RA) | Transmitter address (TA) | Common information (Common info) | User information list (User info list) | Padding (Padding) | Frame control sequence (FCS) |

| B0 B3 | B4 – B15 | B16 | B17 | B18 B19 B20 | B21 B22 | B23 B25 |
|---|---|---|---|---|---|---|
| Trigger Type Trigger frame type | Uplink length (UL Length) | More TF | Carrier sensing required (CS Required) | Uplink bandwidth (UL BW) | Guard interval + long training sequence type (GI + LTF type) | MU-MIMO LTF mode (MU-MIMO LTF Mode) | Number of HE-LTF symbols and midamble periodicity (Number of HE-LTF Symbols and Midamble Periodicity) |

| B26 | B27 | B28 B33 | B34 B35 | B36 | B37 B52 | B53 | B54 B62 |
|---|---|---|---|---|---|---|---|
| Uplink STBC (UL STBC) | LDPC Extra Symbol Segment | AP transmit power (AP TX Power) | Pre-FEC Padding Factor | Packet extension disambiguity (PE Disambiguity) | Uplink spatial reuse (UL Spatial Reuse) | Doppler (Doppler) | UL HE-SIG-A2 reserved (UL HE-SIG-A2 Reserved) |

| B63 | |
|---|---|
| Reserved (Reserved) | Common information based on a trigger frame type (Trigger Dependent Common Info) |

FIG. 2(a)

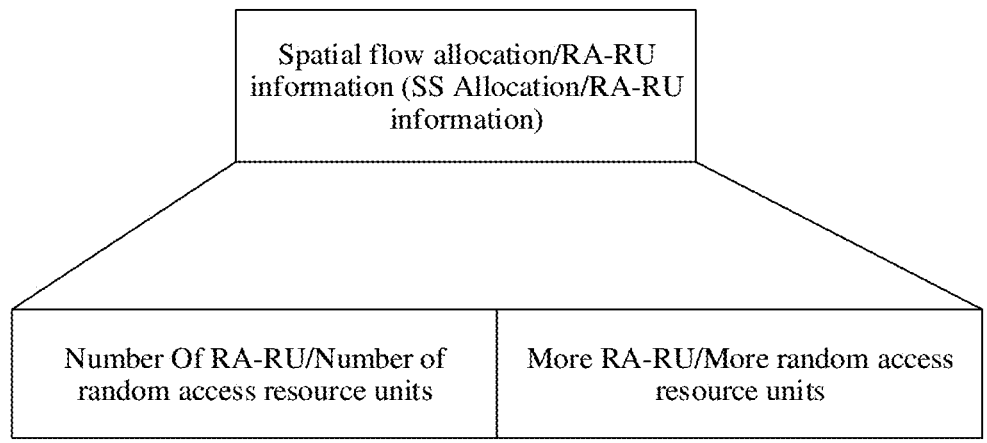
FIG. 2(c)
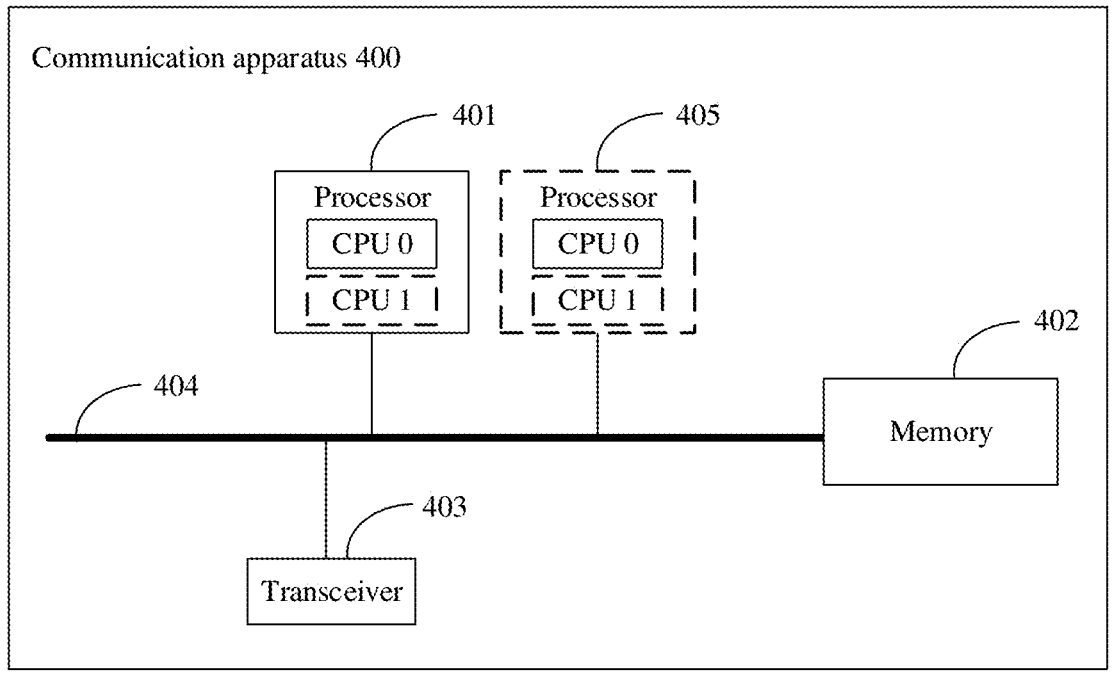
FIG. 3
FIG. 4

METHOD FOR UPLINK ORTHOGONAL FREQUENCY DIVISION MULTIPLE RANDOM ACCESS AND APPARATUS

CROSS-REFERENCE TO RELATED APPLICATIONS

This application is a continuation of International Application No. PCT/CN2020/113625, filed on Sep. 4, 2020, which claims priority to Chinese Patent Application No. 201910843950.3, filed on Sep. 6, 2019. The disclosures of the aforementioned applications are hereby incorporated by reference in their entireties.

TECHNICAL FIELD

Embodiments of this application relate to the field of communication technologies, and in particular, to a method for uplink orthogonal frequency division multiple random access and an apparatus.

BACKGROUND

An uplink orthogonal frequency division multiple access (OFDMA) random access (Uplink OFDMA random access, UORA) mechanism is introduced in IEEE802.11ax, to resolve inflexible resource unit (RU) setting in an uplink access process, and therefore RU allocation is difficult during scheduling, a serious collision among a large number of users occurs during free contention for aperiodic real-time services, and a station (STA) cannot associate with an access point (AP) because power of the STA is lower than that of the AP.

In an existing UORA mechanism, the AP uses a management frame, for example, a beacon frame to broadcast parameters of UORA, including OFDMA contention window (OCW)-related parameters OCWmin and OCWmax. After receiving the beacon frame, the STA may learn of the OCW-related parameters, initialize OCW to OCWmin, and evenly and randomly select a value from OCW as a value of an OFDMA random access backoff (OBO) counter. When the STA receives a trigger frame sent by the AP and sets an association identifier (Association Identifier) AID 12 in a user information (User info) field to 0, it indicates that the AP allocates RUs to perform UORA for an associated station. These RUs are referred to as random access resource units (RA-RUs). The STA obtains a value of a sum of the RA-RUs allocated in the trigger frame, and when the value of the sum is greater than or equal to the value of the OBO counter, sets the value of the OBO counter to 0, evenly and randomly selects an RU from the RA-RUs, and sends uplink data by using the RU. When the value of the sum is less than the value of the OBO counter, the STA subtracts data of the sum from the value of the OBO counter, and then waits for a next trigger frame carrying an RA-RU to continue to perform backoff.

However, in the existing UORA mechanism, one STA supports only one RU for uplink data transmission. This reduces spectral efficiency and network throughput.

SUMMARY

Embodiments of this application provide a method for uplink orthogonal frequency division multiple access random access and an apparatus. One STA may support a plurality of RUs. This improves spectral efficiency and network throughput, and improves network performance.

To achieve the foregoing objective, the following technical solutions are used in the embodiments of this application.

According to a first aspect of the embodiments of this application, a method for uplink orthogonal frequency division multiple access random access is provided, applied to a station STA. The STA supports n resource units RUs. n>1, and n is an integer. The method includes: The STA receives a first trigger frame sent by an access point AP. The first trigger frame includes information used to determine a number k of random access resource units RA-RUs allocated by the AP. k>0, and k is an integer. When the STA determines that a first parameter is greater than or equal to a value of an orthogonal frequency division multiple access (OFDMA) random access backoff (OBO) counter, the STA sets the value of the OBO counter to 0. The STA randomly selects i RA-RUs from the k RA-RUs to send uplink data. i≤n. The first parameter is associated with k. According to this solution, when the STA supports a plurality of RUs, a maximum of n RA-RUs are selected to send the uplink data based on a comparison between the first parameter and the value of the OBO counter when backoff of the OBO counter is 0. Compared with the conventional technology, this improves spectral efficiency and network throughput, and improves network performance. Optionally, the first parameter may be less than or equal to k. It may be understood that, in the first trigger frame, when a number of RUs of the STA scheduled by the AP is m, the STA selects a maximum of n−m RA-RUs from the k RA-RUs to send the uplink data.

With reference to the first aspect, in a possible implementation, the method further includes: When the STA determines that the first parameter is less than the OBO counter, the STA subtracts the first parameter from the value of the OBO counter. According to this solution, when the STA supports a plurality of RUs, based on the comparison between the first parameter and the value of the OBO counter, when the first parameter is less than the value of the OBO counter, the STA subtracts the first parameter from the value of the OBO counter. Compared with the conventional technology, in this embodiment, the STA supports a plurality of RUs to transmit the uplink data. This improves spectral efficiency and network throughput, and improves network performance.

With reference to the first aspect and the foregoing possible implementation, in another possible implementation, the first parameter is $\lfloor k/n \rfloor$, and $\lfloor X \rfloor$ indicates rounding down the real number X. According to this solution, compared with the conventional technology in which k is compared with the value of the OBO counter, a backoff speed of the OBO is reduced. This ensures random access fairness between a STA supporting a plurality of RUs and a STA supporting only a single RU.

With reference to the first aspect and the foregoing possible implementations, in another possible implementation, the method further includes: The STA receives a second trigger frame. The second trigger frame includes information used to determine a number k1 of RA-RUs allocated by the AP. k1>0, and k1 is an integer. When the STA determines that $\lfloor [k1+(k \bmod n)]/(n) \rfloor$ is greater than or equal to the value of the OBO counter, the STA sets the value of the OBO counter to 0. The STA randomly selects i1 RA-RUs from the k1 RA-RUs to send the uplink data. i1≤n, and (k mod n) indicates a remainder of k divided by n. When the STA determines that $\lfloor [k1+(k \bmod n)]/(n) \rfloor$ is less than the value of the OBO counter, the STA subtracts $\lfloor [k1+(k \bmod n)]/(n) \rfloor$ from the value of the OBO counter. According to this solution, the remainder of k divided by n is counted into a total number of RA-RUs in the second trigger frame. This can compensate the number of RA-RUs in the second trigger frame, to avoid that a number of RA-RUs allocated by the AP is less than an actual capability of the STA, or that when a large number of RUs are scheduled by the AP, a backoff speed of the STA is excessively slow.

With reference to the first aspect and the foregoing possible implementations, in another possible implementation, the first trigger frame further includes information used to determine a number m of RUs of the STA scheduled by the AP. m>0, and m is an integer. The first parameter is $\lfloor k/(n-m) \rfloor$, and $\lfloor X \rfloor$ indicates rounding down the real number X. According to this solution, compared with the conventional technology in which k is compared with the value of an OBO counter, a backoff speed of the OBO is reduced considering the actual capability of the STA. This ensures random access fairness between the STA supporting a plurality of RUs and the STA supporting only a single RU. It may be understood that the RU of the STA scheduled by the AP is an RU that is allocated by the AP to the STA and used to perform uplink OFDMA transmission.

With reference to the first aspect and the foregoing possible implementations, in another possible implementation, the method further includes: The STA receives a second trigger frame. The second trigger frame includes information used to determine a number k1 of RA-RUs allocated by the AP. k1>0, and k1 is an integer. m1>0, and m1 is an integer. When the STA determines that $\lfloor \{k1+[k \bmod (n-m)]\}/(n-m1) \rfloor$ is greater than or equal to the value of the OBO counter, the STA sets the value of the OBO counter to 0. The STA randomly selects i1 RA-RUs from the k1 RA-RUs to send the uplink data. i1 (n-m), and [k mod (n-m)] indicates a remainder of k divided by (n-m). When the STA determines that $\lfloor \{k1+[k \bmod (n-m)]\}/(n-m1) \rfloor$ is less than the value of the OBO counter, the STA subtracts $\lfloor k1+[k \bmod (n-m)]\}/(n-m1) \rfloor$ from the value of the OBO counter. According to this solution, the remainder of k divided by (n-m) is counted into the total number of RA-RUs in the second trigger frame. This can compensate the number of RA-RUs in the second trigger frame, to avoid that the number of RA-RUs allocated by the AP is less than the actual capability of the STA, or that when a large number of RUs are scheduled by the AP, the backoff speed of the STA is excessively slow.

With reference to the first aspect and the foregoing possible implementation, in another possible implementation, the first parameter is k. According to this solution, the STA does not consider access fairness between the STA supporting a plurality of RUs and the STA supporting only a single RU.

With reference to the first aspect and the foregoing possible implementations, in another possible implementation, the first trigger frame further includes information used to determine a number m of RUs of the STA scheduled by the AP. m>0, and m is an integer. The method further includes: When the STA determines that m is greater than 0, the STA keeps the value of the OBO counter unchanged. According to this solution, because an actual capability of the STA to perform UORA is (n-m), to be specific, the STA contends for a maximum of (n-m) RA-RUs to transmit the uplink data, to avoid that when performing backoff at a slow backoff speed, the STA supporting a plurality of RUs can only select a small number of RA-RUs to perform UORA. Therefore, the STA may choose not to perform a backoff procedure in this case, in other words, the STA keeps the value of the OBO counter unchanged.

With reference to the first aspect and the foregoing possible implementations, in another possible implementation, the first trigger frame further includes a number m of RUs used by the AP to schedule the STA. m>0, and m is an integer. The method further includes: When the STA determines that the first parameter is greater than or equal to the value of the OBO counter and m is greater than 0, the STA keeps the value of the OBO counter unchanged. According to this solution, when the STA determines that the first parameter is greater than or equal to the value of the OBO counter, if the backoff procedure is performed, the STA sets the value of the OBO counter to 0. However, because m is greater than 0, to be specific, an actual capability of the STA to perform UORA is (n-m), the STA contends for a maximum of (n-m) RA-RUs to transmit the uplink data. Therefore, to avoid that when performing backoff at a slow backoff speed, the STA supporting a plurality of RUs can only select a small number of RA-RUs to perform UORA, the STA may choose not to perform the backoff procedure in this case, in other words, the STA keeps the value of the OBO counter unchanged.

With reference to the first aspect and the foregoing possible implementations, in another possible implementation, the method further includes: The STA obtains exponent minimum contention window EOCWmin, the STA determines OCW based on EOCWmin and n, and the STA randomly selects a value from 0 to OCW as the value of the OBO counter. According to this solution, when the STA supports a plurality of RUs, a value of OCW can be increased based on EOCWmin and n. This can correspondingly increase the value of the OBO counter, and ensure random access fairness between the STA supporting a plurality of RUs and the STA supporting only a single RU while keeping a backoff speed of the OBO counter unchanged.

With reference to the first aspect and the foregoing possible implementations, in another possible implementation, that the STA determines OCW based on EOCWmin and n includes: determining OCW according to the following formula: $OCW = n*(2^{EOCWmin}-1)$, or $OCW = 2^{EOCWmin+n-1}-1$. According to this solution, the value of OCW may be increased based on EOCWmin and n.

With reference to the first aspect and the foregoing possible implementations, in another possible implementation, the method further includes: The STA obtains exponent maximum contention window EOCWmax, and the STA determines an upper limit value of OCW based on EOCWmax and n. According to this solution, the upper limit value of OCW may be correspondingly increased, to avoid that the value of OCW reaches the upper limit value when a number of transmission failures of the STA is small.

With reference to the first aspect and the foregoing possible implementation, in another possible implementation, that the STA determines an upper limit value of OCW based on EOCWmax and n includes: The STA sets OCWmax to $n*(2^{EOCWmax}-1)$ or $2^{EOCWmax+n-1}-1$, or the STA sets the upper limit value of OCW to $n*(2^{EOCWmax}-1)$ or $2^{EOCWmax+n-1}-1$. According to this solution, a value of OCWmax may be increased based on EOCWmax and n, or the upper limit value of OCW may be increased.

According to a second aspect of the embodiments of this application, a method for uplink orthogonal frequency division multiple access random access is provided, applied to a station STA. The STA supports n resource elements RUs. n>1, and n is an integer. The method includes: The STA obtains exponent minimum contention window EOCWmin, the STA determines OCW based on EOCWmin and n, and the STA randomly selects a value from 0 to OCW as a value of an orthogonal frequency division multiple access (OFDMA) random access backoff (OBO) counter. According to this solution, when the STA supports a plurality of RUs, a value of OCW can be increased based on EOCWmin and n. This can correspondingly increase the value of the OBO counter, and ensure random access fairness between the STA supporting a plurality of RUs and a STA supporting only a single RU while keeping a backoff speed of the OBO counter unchanged.

With reference to the second aspect and the foregoing possible implementations, in another possible implementation, that the STA determines OCW based on EOCWmin and n includes: determining OCW according to the following formula: OCW=n*($2^{EOCWmin}$−1), or OCW=$2^{EOCWmin+n-1}$−1. According to this solution, the value of OCW may be increased based on EOCWmin and n.

With reference to the second aspect and the foregoing possible implementation, in another possible implementation, the method further includes: The STA obtains exponent maximum contention window EOCWmax, and the STA determines an upper limit value of OCW based on EOCWmax and n. According to this solution, the upper limit value of OCW may be correspondingly increased, to avoid that the value of OCW reaches the upper limit value when a number of transmission failures of the STA is small.

With reference to the second aspect and the foregoing possible implementation, in another possible implementation, that the STA determines an upper limit value of OCW based on EOCWmax and n includes: The STA sets OCWmax to n*($2^{EOCWmax}$−1) or $2^{EOCWmax+n-1}$−1, or the STA sets the upper limit value of OCW to n*($2^{EOCWmax}$−1) or $2^{EOCWmax+n-1}$−1. According to this solution, a value of OCWmax may be increased based on EOCWmax and n, or the upper limit value of OCW may be increased.

With reference to the second aspect and the foregoing possible implementations, in another possible implementation, the method further includes: The STA receives a first trigger frame sent by an access point AP. The first trigger frame includes information used to determine a number k of random access resource units RA-RUs allocated by the AP. k>0, and k is an integer. When the STA determines that a first parameter is greater than or equal to the value of the OBO counter, the STA sets the value of the OBO counter to 0, and the STA randomly selects i RA-RUs from the k RA-RUs to send uplink data. i≤n. The first parameter is associated with k. According to this solution, when the STA supports a plurality of RUs, a maximum of n RA-RUs are selected to send the uplink data based on a comparison between the first parameter and the value of the OBO counter when backoff of the OBO counter is 0. Compared with the conventional technology, this improves spectral efficiency and network throughput, and improves network performance.

With reference to the second aspect and the foregoing possible implementations, in another possible implementation, the first parameter is k. According to this solution, the value of OCW is increased, and therefore the value of the OBO counter randomly selected from 0 to OCW is also accordingly increased. Therefore, even though k is compared with the value of the OBO counter during backoff in this implementation, because the value of the OBO counter is increased, the overall backoff speed of the OBO counter becomes slower. This ensures random access fairness between the STA supporting a plurality of RUs and the STA supporting only a single RU.

With reference to the second aspect and the foregoing possible implementations, in another possible implementation, the first trigger frame further includes information used to determine a number m of RUs of the STA scheduled by the AP. m>0, and m is an integer. The first parameter is ⌊k*n/(n−m)⌋, and ⌊X⌋ indicates rounding down the real number X. According to this solution, the value of OCW is increased, and therefore the value of the OBO counter randomly selected from 0 to OCW is also accordingly increased. Because an actual capability of the STA is (n−m) that is less than n, the backoff speed of the OBO counter may be correspondingly increased, so that the backoff speed of the OBO counter is increased by n/(n−m). This ensures random access fairness between the STA supporting a plurality of RUs and the STA supporting only a single RU.

With reference to the second aspect and the foregoing implementations, in a possible implementation, the method further includes: When the STA determines that the first parameter is less than the value of the OBO counter, the STA subtracts the first parameter from the value of the OBO counter. According to this solution, the value of OCW is increased, and the value of the OBO counter is also correspondingly increased. This ensures random access fairness between the STA supporting a plurality of RUs and the STA supporting only a single RU while keeping the backoff speed of the OBO counter unchanged. In this embodiment, the STA supports a plurality of RUs to transmit the uplink data. This improves spectral efficiency and network throughput, and improves network performance.

With reference to the second aspect and the foregoing possible implementations, in another possible implementation, when k is less than (n−m), that the STA randomly selects i RA-RUs from the k RA-RUs to send uplink data includes: The STA selects the k RA-RUs to send the uplink data. According to this solution, when a number k of RA-RUs allocated by the AP is less than the actual capability (n−m) of the STA, the STA sends the uplink data on a maximum of the k RA-RUs allocated by the AP.

With reference to the second aspect and the foregoing possible implementations, in another possible implementation, when the first parameter is k, the method further includes: The STA receives a second trigger frame. The second trigger frame includes information used to determine a number k1 of RA-RUs allocated by the AP. k1>0, and k1 is an integer. When the STA determines that k1+(n−k) is greater than or equal to the value of the OBO counter, the STA sets the value of the OBO counter to 0. The STA randomly selects i1 RA-RUs from the k1 RA-RUs to send the uplink data. i1≤n. When the STA determines that k1+(n−k) is less than the value of the OBO counter, the STA subtracts k1+(n−k) from the value of the OBO counter. According to this solution, the value of OCW is increased, and the value of the OBO counter is also correspondingly increased. A number of RA-RUs in a fourth trigger frame is compensated, to avoid that a backoff speed of the STA is excessively slow when a number of RA-RUs allocated by the AP is less than the actual capability of the STA. This ensures random access fairness between the STA supporting a plurality of RUs and the STA supporting only a single RU.

With reference to the second aspect and the foregoing possible implementations, in another possible implementation, the method further includes: When the STA determines that k is greater than or equal to the value of the OBO counter and k is less than (n−m), the STA keeps the value of the OBO counter unchanged. According to this solution, because k is less than (n−m), the STA contends for a maximum of k2 RA-RUs to transmit the uplink data, to be specific, the STA can select a small number of RA-RUs. To avoid that when performing backoff at a slow backoff speed, the STA supporting a plurality of RUs can only select a small number of RA-RUs to perform UORA, the STA may choose not to perform a backoff procedure in this case, in other words, the STA keeps the value of the OBO counter unchanged.

According to a third aspect of the embodiments of this application, a method for uplink orthogonal frequency division multiple access random access is provided, applied to a station STA. The STA supports n resource units RUs. n>1, and n is an integer. The STA maintains n orthogonal frequency division multiple access (OFDMA) random access backoff (OBO) counters. The method includes: The STA receives a trigger frame sent by an access point AP. The trigger frame includes information used to determine a number k of random access resource units RA-RUs allocated by the AP. k>0, and k is an integer. When the STA determines that a first parameter is greater than or equal to a value of each of i OBO counters, the STA separately sets values of the i OBO counters to 0. The STA randomly selects i RA-RUs from the k RA-RUs to send uplink data. The i RA-RUs are different from each other, i is greater than or equal to 1 and less than or equal to n, and i is an integer. The first parameter is associated with k. According to this solution, the STA maintains a plurality of OBO counters, to be specific, the STA maintains a plurality of backoff procedures, so that a STA supporting a plurality of RUs obtains more access opportunities than a STA supporting a single RU. Compared with the conventional technology, in this embodiment, the STA supports a plurality of RUs to transmit the uplink data. This improves spectral efficiency and network throughput, and improves network performance.

With reference to the third aspect, in a possible implementation, the method further includes: When the STA determines that the first parameter is less than a value of each of j OBO counters, the STA separately subtracts the first parameter from values of the j OBO counters. j is greater than or equal to 0 and less than or equal to n, and j is an integer. According to this solution, the STA maintains a plurality of OBO counters, to be specific, the STA separately maintains a plurality of backoff procedures, so that the STA supporting a plurality of RUs obtains more access opportunities than the STA supporting a single RU.

With reference to the third aspect and the foregoing possible implementation, in another possible implementation, the first parameter is k, or the first parameter is $\lfloor k/n \rfloor$ and $\lfloor X \rfloor$ indicates rounding down the real number X. Alternatively, the trigger frame further includes information used to determine a number m of RUs of the STA scheduled by the AP. m>0, and m is an integer, the first parameter is $\lfloor k/(n-m) \rfloor$, and $\lfloor X \rfloor$ indicates rounding down the real number X. According to this solution, the first parameter may have different values. It may be understood that a backoff speed of the OBO counter varies with different values of the first parameter.

With reference to the third aspect and the foregoing possible implementations, in another possible implementation, values of the n OBO counters are different from each other. According to this solution, initial values of the plurality of OBO counters maintained by the STA are different from each other, and this ensures that i>k does not occur, and a case in which mutually different i RA-RUs cannot be selected from the k RA-RUs does not occur.

With reference to the third aspect and the foregoing possible implementations, in another possible implementation, when k is less than or equal to i, that the STA randomly selects i RA-RUs from the k RA-RUs to send uplink data includes: The STA selects the k RA-RUs to send the uplink data. According to this solution, when the number k of RA-RUs allocated by the AP is less than a number of OBO counters whose backoff is 0, the STA sends the uplink data by using a maximum of the k RA-RUs.

With reference to the first aspect, the second aspect, the third aspect, and the foregoing possible implementations, in another possible implementation, the method further includes: When no acknowledgment message sent by the AP is received in response to the uplink data transmitted by all RA-RUs, the STA determines that transmission fails. The acknowledgment message is used to indicate that the AP successfully receives data transmitted by the RA-RU. Alternatively, when the acknowledgment message sent by the AP is not received in response to the uplink data transmitted by one or more RA-RUs, the STA determines that transmission fails. According to this solution, the STA may determine that there may be a plurality cases of transmission failure. If the STA determines that transmission fails, a value of OCW is doubled.

According to a fourth aspect of the embodiments of this application, a communication apparatus is provided. The communication apparatus supports n resource units RUs. n>1, and n is an integer. The communication apparatus includes a transceiver unit and a processing unit. The transceiver unit is configured to receive a first trigger frame sent by an access point AP. The first trigger frame includes information used to determine a number k of random access resource units RA-RUs allocated by the AP. k>0, and k is an integer. The processing unit is configured to: when a determining unit determines that a first parameter is greater than or equal to a value of an orthogonal frequency division multiple access (OFDMA) random access backoff (OBO) counter, set the value of the OBO counter to 0, and randomly select i RA-RUs from the k RA-RUs. i≤n. The transceiver unit is further configured to send uplink data by using the i RA-RUs determined by the processing unit. The first parameter is associated with k. Optionally, the first parameter may be less than or equal to k.

With reference to the fourth aspect, in a possible implementation, the processing unit is further configured to: when the processing unit determines that the first parameter is less than the OBO counter, subtract the first parameter from the value of the OBO counter.

With reference to the fourth aspect and the foregoing possible implementation, in another possible implementation, the first parameter is $\lfloor k/n \rfloor$, and $\lfloor X \rfloor$ indicates rounding down the real number X.

With reference to the fourth aspect and the foregoing possible implementations, in another possible implementation, the transceiver unit is further configured to receive a second trigger frame. The second trigger frame includes information used to determine a number k1 of RA-RUs allocated by the AP. k1>0, and k1 is an integer. The processing unit is further configured to: when the processing unit determines that $\lfloor [k1+(k \bmod n)]/(n) \rfloor$ is greater than or equal to the value of the OBO counter, set the value of the OBO counter to 0, and randomly select i1 RA-RUs from the k1 RA-RUs. i1≤n. (k mod n) indicates a remainder of k divided by n. The transceiver unit is further configured to send the uplink data by using the i1 RA-RUs selected by the processing unit. The processing unit is further configured to: when the processing unit determines that $\lfloor [k1+(k \bmod n)]/(n) \rfloor$ is less than the value of the OBO counter, subtract $\lfloor [k1+(k \bmod n)]/(n) \rfloor$ from the value of the OBO counter.

With reference to the fourth aspect and the foregoing possible implementations, in another possible implementation, the first trigger frame further includes information used to determine a number m of RUs of the communication apparatus scheduled by the AP. m>0, and m is an integer. The first parameter is $\lfloor k/(n-m) \rfloor$, and $\lfloor X \rfloor$ indicates rounding down the real number X.

With reference to the fourth aspect and the foregoing possible implementations, in another possible implementation, the transceiver unit is further configured to receive a second trigger frame. The second trigger frame includes information used to determine a number k1 of RA-RUs allocated by the AP and a number m1 of RUs of the communication apparatus scheduled by the AP. k1>0, and k1 is an integer. m1>0, and m1 is an integer. The processing unit is further configured to: when the processing unit determines that $\lfloor \{k1+(k \bmod n-m)\}/(n-m1) \rfloor$ is greater than or equal to the value of the OBO counter, set the value of the OBO counter to 0, and randomly select i1 RA-RUs from the k1 RA-RUs. i1≤(n−m). [k mod (n−m)] indicates a remainder of k divided by (n−m). The transceiver unit is further configured to send the uplink data by using the i1 RA-RUs selected by the processing unit. The processing unit is further configured to: when the processing unit determines that $\lfloor \{k1+(k \bmod n)\}/(n-m1) \rfloor$ is less than the value of the OBO counter, subtract $\lfloor \{k1+(k \bmod n)\}/(n-m1) \rfloor$ from the value of the OBO counter.

With reference to the fourth aspect and the foregoing possible implementations, in another possible implementation, the first parameter is k.

With reference to the fourth aspect and the foregoing possible implementations, in another possible implementation, the first trigger frame further includes information used to determine a number m of RUs of the communication apparatus scheduled by the AP. m>0, and m is an integer. The processing unit is further configured to: when the processing unit determines that m is greater than 0, keep the value of the OBO counter unchanged.

With reference to the fourth aspect and the foregoing possible implementations, in another possible implementation, the first trigger frame further includes a number m of RUs of the communication apparatus scheduled by the AP. m>0, and m is an integer. The processing unit is further configured to: when the processing unit determines that the first parameter is greater than or equal to the value of the OBO counter and m is greater than 0, keep the value of the OBO counter unchanged.

With reference to the fourth aspect and the foregoing possible implementations, in another possible implementation, the transceiver unit is further configured to obtain exponent minimum contention window EOCWmin. The processing unit is further configured to determine OCW based on EOCWmin and n. The processing unit is further configured to randomly select a value from 0 to OCW as the value of the OFDMA random access backoff (OBO) counter.

With reference to the fourth aspect and the foregoing possible implementations, in another possible implementation, the processing unit is specifically configured to determine OCW according to the following formula: $OCW = n*(2^{EOCWmin}-1)$, or $OCW = 2^{EOCWmin+n-1}-1$.

With reference to the fourth aspect and the foregoing possible implementations, in another possible implementation, the transceiver unit is further configured to obtain exponent maximum contention window EOCWmax. The processing unit is further configured to determine an upper limit value of OCW based on EOCWmax and n.

With reference to the fourth aspect and the foregoing possible implementations, in another possible implementation, the processing unit is specifically configured to set OCWmax to $n*(2^{EOCWmax}-1)$ or $2^{EOCWmax+n-1}-1$, or set the upper limit value of OCW to $n*(2^{EOCWmax}-1)$ or $2^{EOCWmax+n-1}-1$.

According to a fifth aspect of the embodiments of this application, a communication apparatus is provided. The communication apparatus supports n resource units RUs. n>1, and n is an integer. The communication apparatus includes a transceiver unit and a processing unit. The transceiver unit is configured to obtain exponent minimum contention window EOCWmin. The processing unit is configured to determine OCW based on EOCWmin and n that are obtained by the transceiver unit. The processing unit is further configured to randomly select a value from 0 to OCW as a value of an orthogonal frequency division multiple access (OFDMA) random access backoff (OBO) counter.

With reference to the fifth aspect, in a possible implementation, the processing unit is specifically configured to determine OCW according to the following formula:

$$OCW = n*(2^{EOCWmin}-1), \text{ or } OCW = 2^{EOCWmin+n-1}-1.$$

With reference to the fifth aspect and the foregoing possible implementation, in another possible implementation, the transceiver unit is further configured to obtain exponent maximum contention window EOCWmax. The processing unit is further configured to determine an upper limit value of OCW based on EOCWmax and n.

With reference to the fifth aspect and the foregoing possible implementations, in another possible implementation, the processing unit is specifically configured to set OCWmax to $n*(2^{EOCWmax}-1)$ or $2^{EOCWmax+n-1}-1$, or set the upper limit value of OCW to $n*(2^{EOCWmax}-1)$ or $2^{EOCWmax+n-1}-1$.

With reference to the fifth aspect and the foregoing possible implementations, in another possible implementation, the transceiver unit is further configured to receive a first trigger frame sent by an access point AP. The first trigger frame includes information used to determine a number k of random access resource units RA-RUs allocated by an access point AP. k>0, and k is an integer. The processing unit is configured to: when the processing unit determines that a first parameter is greater than or equal to the value of the OBO counter, set the value of the OBO counter to 0, and randomly select i RA-RUs from the k RA-RUs. i≤n. The first parameter is associated with k. The transceiver unit is further configured to send uplink data by using the i RA-RUs selected by the processing unit.

With reference to the fifth aspect and the foregoing possible implementations, in another possible implementation, the first parameter is k.

With reference to the fifth aspect and the foregoing possible implementations, in another possible implementation, the first trigger frame further includes information used to determine a number m of RUs of the STA scheduled by the AP. m>0, and m is an integer. The first parameter is $\lfloor k*n/(n-m) \rfloor$, and $\lfloor X \rfloor$ indicates rounding down the real number X.

With reference to the fifth aspect and the foregoing possible implementations, in another possible implementation, the processing unit is further configured to: when the processing unit determines that the first parameter is less than the value of the OBO counter, subtract the first parameter from the value of the OBO counter.

With reference to the fifth aspect and the foregoing possible implementations, in another possible implementation, the processing unit is further configured to: when k is less than (n−m), select the k RA-RUs to send the uplink data.

With reference to the fifth aspect and the foregoing possible implementations, in another possible implementation, when the first parameter is k, the transceiver unit is further configured to receive a second trigger frame. The second trigger frame includes information used to determine a number k1 of RA-RUs allocated by the AP. k1>0, and k1 is an integer. The processing unit is further configured to: when the processing unit determines that k1+(n−k) is greater than or equal to the value of the OBO counter, set the value of the OBO counter to 0, and randomly select i1 RA-RUs from the k1 RA-RUs. i1≤n. The transceiver unit is further configured to send the uplink data by using the i1 RA-RUs selected by the processing unit. The processing unit is further configured to: when the processing unit determines that k1+(n−k) is less than the value of the OBO counter, subtract k1+(n−k) from the value of the OBO counter.

With reference to the fifth aspect and the foregoing possible implementations, in another possible implementation, the processing unit is further configured to: when the processing unit determines that k is greater than or equal to the value of the OBO counter and k is less than (n−m), keep the value of the OBO counter unchanged.

According to a sixth aspect of the embodiments of this application, a communication apparatus is provided. The communication apparatus supports n resource units RUs. n>1 and n is an integer. The communication apparatus maintains n orthogonal frequency division multiple access (OFDMA) random access backoff (OBO) counters. The communication apparatus includes a transceiver unit and a processing unit. The transceiver unit is configured to receive a trigger frame sent by an access point AP. The trigger frame includes information used to determine a number k of random access resource units RA-RUs allocated by the AP. k>0, and k is an integer. The processing unit is configured to: when the processing unit determines that a first parameter is greater than or equal to a value of each of i OBO counters, separately set values of the i OBO counters to 0, and randomly select i RA-RUs from the k RA-RUs. The i RA-RUs are different from each other, i is greater than or equal to 1 and less than or equal to n, and i is an integer. The first parameter is associated with k. The transceiver unit is further configured to send uplink data by using the i RA-RUs selected by the processing unit.

With reference to the sixth aspect, in a possible implementation, the processing unit is further configured to: when the processing unit determines that the first parameter is less than a value of each of j OBO counters, separately subtract the first parameter from values of the j OBO counters. j is greater than or equal to 0 and less than or equal to n, and j is an integer.

With reference to the sixth aspect and the foregoing possible implementation, in another possible implementation, the first parameter is k, or the first parameter is $\lfloor k/n \rfloor$ and $\lfloor X \rfloor$ indicates rounding down the real number X. Alternatively, the trigger frame further includes information used to determine a number m of RUs of the STA scheduled by the AP. m>0, and m is an integer, the first parameter is $\lfloor k/(n-m) \rfloor$, and $\lfloor X \rfloor$ indicates rounding down the real number X.

With reference to the sixth aspect and the foregoing possible implementations, in another possible implementation, values of the n OBO counters are different from each other.

With reference to the sixth aspect and the foregoing possible implementations, in another possible implementation, the processing unit is further configured to: when k is less than or equal to i, select the k RA-RUs to send the uplink data.

With reference to the fourth aspect, the fifth aspect, the sixth aspect, and the foregoing possible implementations, in another possible implementation, the processing unit is further configured to: when no acknowledgment message sent by the AP is received in response to the uplink data transmitted by all RA-RUs, determine that transmission fails. The acknowledgment message is used to indicate that the AP successfully receives data transmitted by the RA-RU. The processing unit is further configured to: when the acknowledgment message sent by the AP is not received in response to the uplink data transmitted by one or more RA-RUs, determine that transmission fails.

For descriptions of effect of the fourth aspect and the implementations of the fourth aspect, refer to descriptions of corresponding effects of the first aspect and the implementations of the first aspect. For descriptions of effect of the fifth aspect and the implementations of the fifth aspect, refer to descriptions of corresponding effects of the second aspect and the implementations of the second aspect. For descriptions of effect of the sixth aspect and the implementations of the sixth aspect, refer to descriptions of corresponding effects of the third aspect and the implementations of the third aspect. Details are not described herein again.

The communication apparatus in the fourth aspect, the fifth aspect, and the sixth aspect may be a chip. The processing unit may be a processing circuit of the chip, the transceiver unit may be an input/output interface circuit, the processing circuit may be configured to process signaling or data information provided by the input/output interface circuit, and the input/output interface circuit may be configured to input/output data or signaling information for the chip.

According to a seventh aspect of the embodiments of this application, a computer-readable storage medium is provided. The computer-readable storage medium stores computer program code. When the computer program code is run on a processor, the processor is enabled to perform the method in any one of the foregoing aspects.

According to an eighth aspect of the embodiments of this application, a computer program product is provided. The program product stores computer software instructions executed by the foregoing processor. The computer software instructions include a program used to perform the solutions in the foregoing aspects.

According to a ninth aspect of the embodiments of this application, a communication apparatus is provided. The apparatus includes a processor, and may further include a transceiver and a memory. The transceiver is configured to send and receive information, or configured to communicate with another network element. The memory is configured to store computer-executable instructions. The processor is configured to execute the computer-executable instructions, to support the communication apparatus to implement the method according to any one of the foregoing aspects.

According to a tenth aspect of the embodiments of this application, a communication apparatus is provided. The apparatus may exist in a product form of a chip. A structure of the apparatus includes a processor, and may further include a memory. The memory is configured to be coupled to the processor to store program instructions and data that are necessary for the apparatus. The processor is configured to execute the program instructions stored in the memory, to support the communication apparatus to perform the method according to any one of the foregoing aspects.

According to an eleventh aspect of the embodiments of this application, a communication apparatus is provided. The apparatus may exist in a product form of a chip. A structure of the apparatus includes a processor and an interface circuit. The processor is configured to communicate with another apparatus through a receiving circuit, to enable the apparatus to perform the method according to any one of the foregoing aspects.

BRIEF DESCRIPTION OF THE DRAWINGS

FIG. 2(a) is a schematic diagram 1 of a frame structure of a trigger frame according to an embodiment of this application;

FIG. 2(c) is a schematic diagram 3 of a frame structure of a trigger frame according to an embodiment of this application;

FIG. 3 is a schematic diagram of a transmission format of uplink data according to an embodiment of this application;

FIG. 4 is a schematic diagram of a structure of a communication apparatus according to an embodiment of this application;

DETAILED DESCRIPTION OF ILLUSTRATIVE EMBODIMENTS

Figure 1:
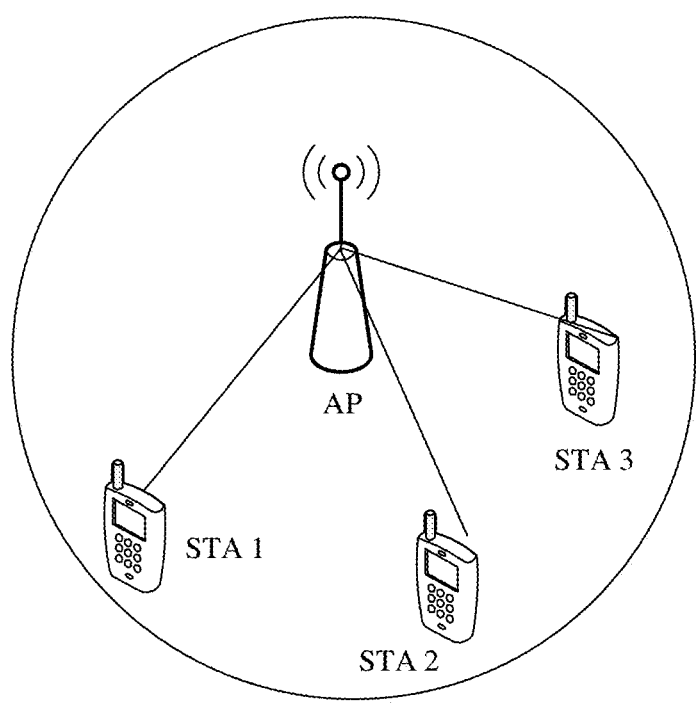
FIG. 1 is a schematic diagram of a structure of a communication system according to an embodiment of this application.

The following describes technical solutions in the embodiments of this application with reference to the accompanying drawings in the embodiments of this application. In this application, "at least one" means one or more, and "a plurality of" means two or more. The term "and/or" describes an association relationship between associated objects and indicates that three relationships may exist. For example, A and/or B may represent the following cases: Only A exists, both A and B exist, and only B exists, where A and B may be singular or plural. The character "/" generally indicates an "or" relationship between the associated objects. "At least one of the following items (pieces)" or a similar expression thereof refers to any combination of these items, including any combination of singular items (pieces) or plural items (pieces). For example, at least one item (piece) of a, b, or c may represent a, b, c, a and b, a and c, b and c, or a, b, and c, where a, b, and c each may be singular or plural.

It should be noted that, in this application, a term such as "example" or "for example" is used to represent giving an example, an illustration, or descriptions. Any embodiment or design solution described as an "example" or "for example" in this application should not be explained as being more preferable or having more advantages than another embodiment or design solution. Exactly, use of the word such as "example" or "for example" is intended to present a related concept in a specific manner.

The embodiments of this application provide a method for uplink orthogonal frequency division multiple access random access. The method is applied to a wireless local area network. A system structure of the wireless local area network includes at least one access point (AP for short) and at least one station (STA). The station STA may be a station supporting the 802.11 series protocols, for example, an extremely high throughput (EHT) station. In the following embodiments, only an example in which a station is the STA is used for description.

For example, the STA in the embodiments of this application may be an apparatus that supports the 802.11 series protocols and has a wireless transceiver function. For example, the STA may be web-connected user equipment, for example, a tablet computer, a desktop computer, a laptop computer, a notebook computer, an ultra-mobile personal computer (UMPC), a handheld computer, a netbook, a personal digital assistant (PDA), or a mobile phone, an internet of things node in the internet of things, or the like. The AP in the embodiments of this application may be an apparatus that supports the 802.11 series protocols and provides a service for the STA. For example, the AP may be a communication entity, for example, a communication server, a router, a switch, or a bridge, or the AP may include various forms of macro base stations, micro base stations, relay stations, and the like. Specific forms of the STA and the AP are not specifically limited in the embodiments of this application, and are merely examples for description herein.

For example, as shown in FIG. 1, the method for uplink orthogonal frequency division multiple access random access provided in the embodiments of this application may be applied to the communication system shown in FIG. 1. In the communication system, one access point AP may perform data transmission with a plurality of STAs. For example, the AP in FIG. 1 may transmit uplink data or downlink data with a STA 1, a STA 2, and a STA 3.

However, in some scenarios, some problems occur when the AP communicates with a plurality of STAs. For example, generally, power of the AP is 10 dB higher or even higher than that of the STA. This causes a problem that the STA can detect a beacon frame sent by the AP, but cannot associate with the AP. For another example, for an aperiodic real-time service, overheads of rotation scheduling are large, and a serious collision occurs during free contention of a large number of STAs. For another example, because one STA supports only one resource unit (RU), and setting of the RU is not flexible, it often causes a problem that RU allocation is difficult in a scheduling process.

To resolve problems in the foregoing scenarios, IEEE 802.11ax introduces an uplink orthogonal frequency division multiple access (OFDMA) random access (Uplink OFDMA random access, UORA) mechanism. In the UORA mechanism, the AP broadcasts parameters of UORA by using management frames such as beacon frames. After receiving the beacon frame, the STA may learn of the parameter of UORA, and determine a value of an OFDMA random access backoff (OBO) counter based on the parameter of UORA. When the STA receives a trigger frame (Trigger frame) sent by the AP and sets an association identifier AID 12 in a user information (User info) field to 0 or 2045, it indicates that the AP allocates RUs to an associated station or a non-associated station to perform UORA. These RUs are referred to as random access resource units (RA-RUs). The STA obtains a value of a sum of the RA-RUs allocated in the trigger frame, and when the value of the sum is greater than or equal to the value of the OBO counter, sets the value of the OBO counter to 0, evenly and randomly selects an RU from the RA-RUs, and sends uplink data by using the RU. When the value of the sum is less than the value of the OBO counter, the STA subtracts data of the sum from the value of the OBO counter, and then waits for a next trigger frame carrying an RA-RU to continue to perform backoff.

However, in the existing UORA mechanism, one STA supports only one RU for uplink data transmission. This results a problem of low spectral efficiency and network throughput. Currently, most vendors agree to expand capabilities of the STA, so that the STA can support a plurality of RUs. After the STA supports a plurality of RUs, to ensure access fairness between the STA supporting a plurality of RUs and a STA supporting only a single RU, an embodiment of this application provides a method for uplink orthogonal frequency division multiple access random access.

Figure 2B:
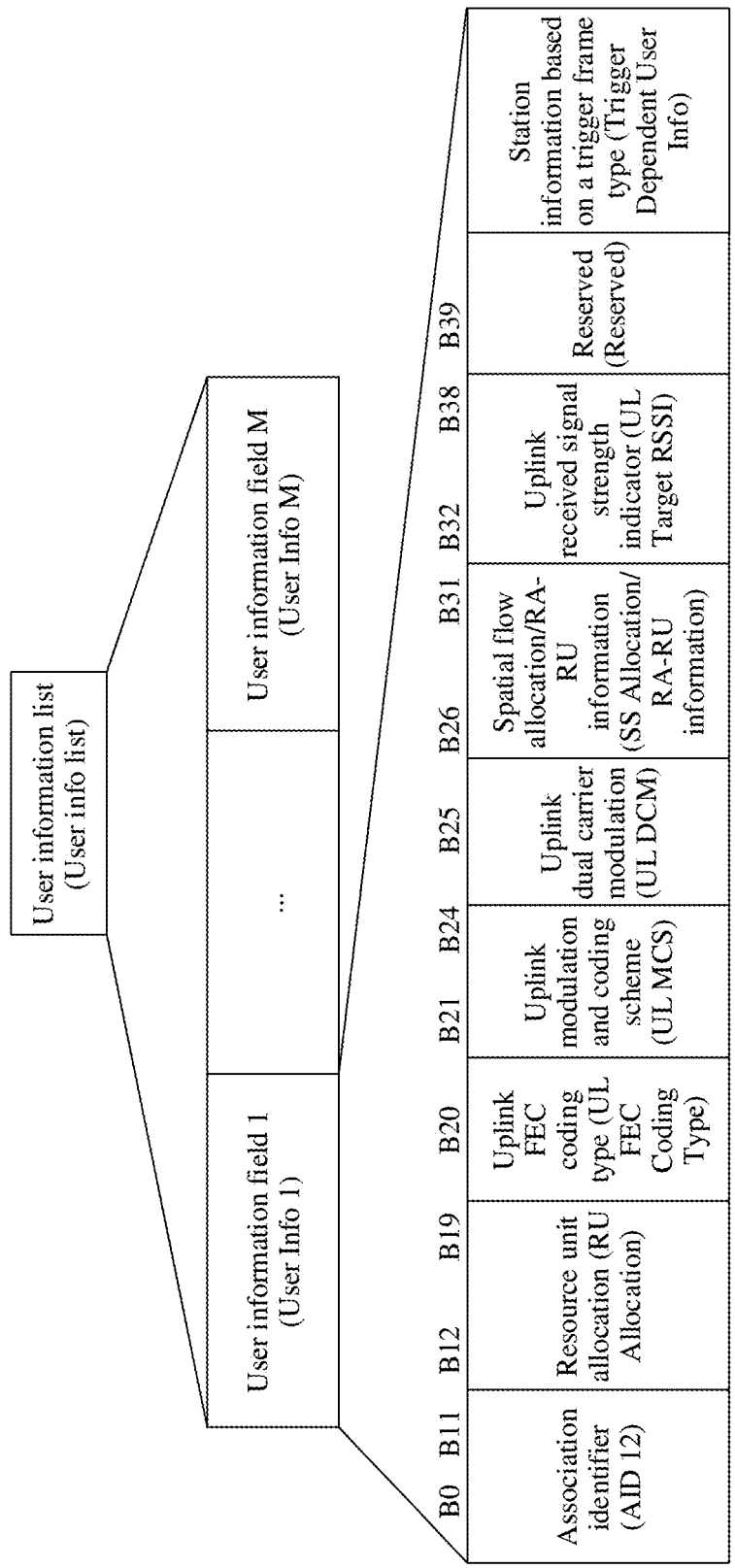
FIG. 2(b) is a schematic diagram 2 of a frame structure of a trigger frame according to an embodiment of this application.

For example, the trigger frame sent by the AP to the STA includes resource indication information for scheduled transmission. The trigger frame is divided into common information and a user information list. A field structure of the common information is shown in FIG. 2(a). The common information includes information that all STAs need to read. A field structure of the user information list is shown in FIG. 2(b). The user information list includes information that each STA needs to read. When an association identifier (AID 12) field in FIG. 2(b) ranges from 1 to 2007, a resource unit allocation field (RU Allocation) indicates an RU allocated to a STA identified by the AID 12 field. When the AID 12 field is 0 or 2045, the resource unit allocation field (RU Allocation) indicates a start RU of one or more consecutive RA-RUs allocated by the user information (User Info) field. When the AID 12 field is 2046, the resource unit allocation field (RU Allocation) indicates an unallocated RU.

A structure of an RA-RU information field in FIG. 2(b) is shown in FIG. 2(c). A number of random access resource units (Number Of RA-RU) field is used to indicate a number of consecutive RUs allocated to UORA. To be specific, the number of RA-RU field may indicate a number of resource units that are consecutively allocated as RA-RUs starting from a resource unit RU corresponding to the RU allocation field.

It should be noted that, when a plurality of AIDs 12 in a first trigger frame are 0 or 2045, a number of RA-RUs allocated by the AP is a sum of numbers of RA-RUs indicated by number of RA-RU fields in all user info fields whose AIDs 12 are 0 or 2045 in the first trigger frame. The RU indicated by the RU allocation field is an RU allocated to the STA 1 for OFDMA uplink transmission. An RU of the STA 1 scheduled by the AP is an RU allocated by the AP to the STA 1 and used to perform uplink OFDMA transmission. When a plurality of AIDs 12 in the first trigger frame are AIDs of the STA 1, a number of RUs of the STA 1 scheduled by the AP is a number of all user info fields whose AID 12 fields are set to the AIDs of the STA 1 in the first trigger frame. Because one user information (User info) field includes only one AID field and one RU allocation field, the number of RUs of the STA 1 scheduled by the AP may be further equal to a number of AIDs 12 that are the AIDs of the STA 1.

For example, after receiving the trigger frame, the STA sends the high efficient trigger-based physical layer protocol data unit (HE TB PPDU, one of four HE PPDUs) based on the resource indication information carried in the trigger frame. As shown in FIG. 3, the data unit first includes a legacy preamble (L-Preamble). The L-preamble includes a legacy short training field (L-STF), a legacy long training field (L-LTF), and a legacy signaling field (L-SIG) that are used to ensure backward compatibility, so that a STA supporting a standard of an earlier version can read a legacy preamble part. In addition, the preamble also includes repeated legacy signal field (RL-SIG) that is used by 802.11ax for automatic detection and robustness enhancement of L-SIG. The preamble further includes a high efficient signal field A (HE-SIG-A) that carries related signaling information required for reading data. Subsequently, the data unit includes a high efficient short training sequence (HE-STF) and a high efficient long training sequence (HE-LTF), respectively used to perform automatic gain control (AGC) and channel measurement in a multiple-input multiple-output (MIMO) case. The HE-LTF field may include a plurality of HE-LTF symbols, and is used for performing channel measurement on a plurality of space-time streams. Finally, the data unit includes a data part, used to carry a medium access control (MAC) frame.

During specific implementation, each device (for example, the AP or the STA) shown in FIG. 1 may use the composition structure shown in FIG. 4, or include components shown in FIG. 4.

For example, FIG. 4 is a schematic diagram of composition of a communication apparatus 400 according to an embodiment of this application. As shown in FIG. 4, the communication apparatus 400 may include at least one processor 401, a memory 402, a transceiver 403, and a communication bus 404.

The following specifically describes the components of the communication apparatus 400 with reference to FIG. 4.

The processor 401 is a control center of the communication apparatus 400, and may be one processor or may be a collective term of a plurality of processing elements. For example, the processor 401 may be a central processing unit (CPU), or an application-specific integrated circuit (ASIC), or may be configured as one or more integrated circuits implementing this embodiment of the present invention, for example, one or more microprocessors (DSP) or one or more field programmable gate arrays (FPGA).

The processor 401 may execute various functions of the communication device by running or executing a software program stored in the memory 402 and invoking data stored in the memory 402.

During specific implementation, in an embodiment, the processor 401 may include one or more CPUs, for example, a CPU 0 and a CPU 1 shown in FIG. 4.

During specific implementation, in an embodiment, the communication apparatus 400 may include a plurality of processors, for example, the processor 401 and a processor 405 shown in FIG. 4. Each of the processors may be a single-core (single-CPU) processor or may be a multi-core (multi-CPU) processor. The processor herein may be one or more communication devices, circuits, and/or processing cores configured to process data (for example, computer program instructions).

The memory 402 may be a read-only memory (ROM) or another type of static storage communication device that can store static information and instructions, or a random access memory (RAM) or another type of dynamic storage communication device that can store information and instructions. The memory 402 may alternatively be an electrically erasable programmable read-only memory (EEPROM), a compact disc read-only memory (CD-ROM) or another compact disc storage, optical disc storage (including a compact disc, a laser disc, an optical disc, a digital versatile disc, a Blu-ray disc, or the like), a magnetic disk storage medium or another magnetic storage communication device, or any other medium that can be used to carry or store expected program code in a form of instructions or a data structure and that is accessible by a computer, but is not limited thereto. The memory 402 may exist independently, and is connected to the processor 401 through the communication bus 404. Alternatively, the memory 402 may be integrated with the processor 401.

The memory 402 is configured to store a software program for executing the solutions of the present invention, and the processor 401 controls the execution.

The transceiver 403 is configured to communicate with an access point. Certainly, the transceiver 403 may be further configured to communicate with a communication network, for example, the Ethernet, a radio access network (RAN), or a wireless local area network (WLAN). The transceiver 403 may include a receiving unit for implementing a receiving function and a sending unit for implementing a sending function.

The communication bus 404 may be an industry standard architecture (ISA) bus, a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 4, but this does not mean that there is only one bus or only one type of bus.

It should be noted that the communication apparatus 400 may be a desktop computer, a portable computer, a network server, a mobile phone, a tablet computer, a wireless terminal, an embedded device, a chip system, or a device having a structure similar to that in FIG. 4. In addition, the composition structure shown in FIG. 4 does not constitute a limitation on the communication apparatus. In addition to the components shown in FIG. 4, the communication apparatus may include more or fewer components than those shown in the figure, or some components may be combined, or different component arrangements may be used. For example, the communication apparatus 400 further includes an output device and an input device. For example, the input device includes a device, for example, a keyboard, a mouse, a microphone, and a joystick, and the output device includes a device, for example, a display screen and a speaker.

Figure 5:
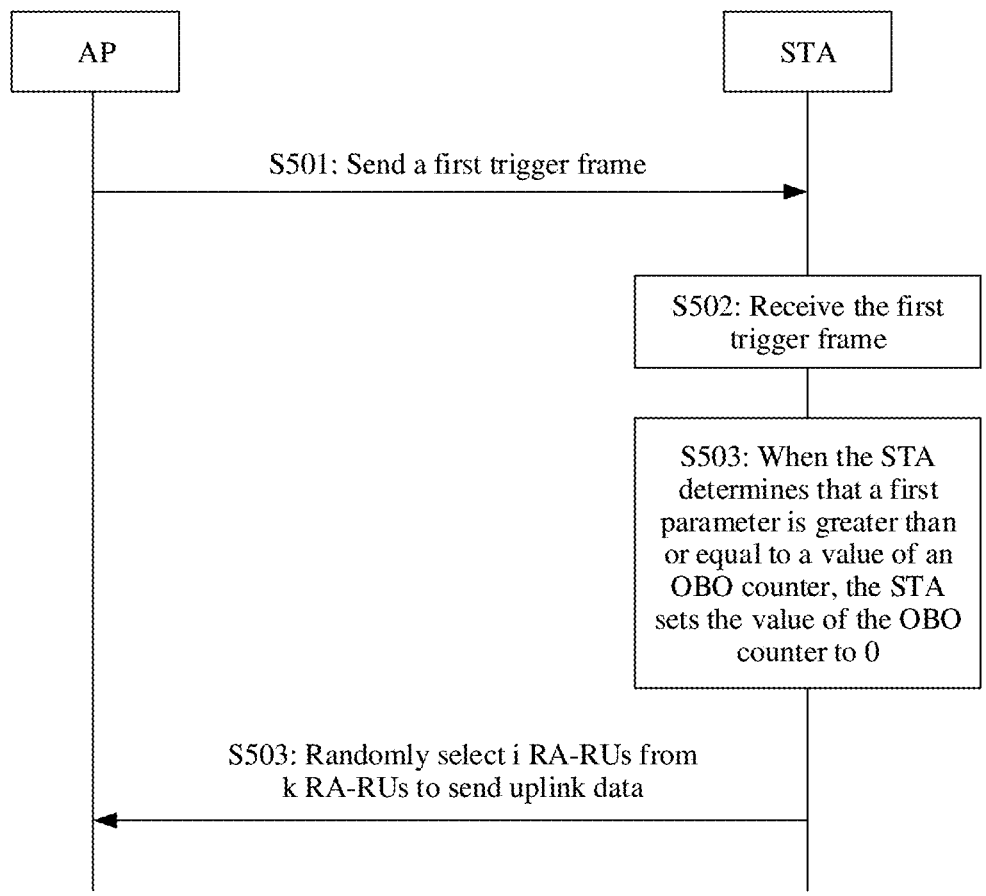
FIG. 5 is a schematic flowchart of a method for uplink orthogonal frequency division multiple access random access according to an embodiment of this application.

With reference to FIG. 1 to FIG. 4, an embodiment of this application provides a method for uplink orthogonal frequency division multiple access random access. In the method, a STA supports n resource units RUs, n>1, and n is an integer. As shown in FIG. 5, the method includes steps S501 to S503.

S501: An AP sends a first trigger frame to the STA, where the first trigger frame includes information used to determine a number k of RA-RUs allocated by the AP, k>0, and k is an integer.

For example, a frame structure of the first trigger frame is shown in FIG. 2(*a*) to FIG. 2(*c*). The foregoing information used to determine the number k of RA-RUs allocated by the AP may be carried in an RA-RU information (RA-RU Information) field in FIG. 2(*b*), and specifically, may be carried in a number of RA-RU field in FIG. 2(*c*). The number k of RA-RUs allocated by the AP is a sum of numbers of RA-RUs indicated by number of RA-RU fields in all user info fields whose AID 12 is 0 or 2045 in the first trigger frame. When the AID 12 is 0 or 2045, an RU allocation field indicates a start RU of one or more consecutive RA-RUs allocated by the user information (User Info) field.

For example, in the first trigger frame, there are two user info fields whose AID 12 is 0: a number of RA-RU field of one user info field is 2, and a number of RA-RU field of the other user info field is 3. In this case, the number k of RA-RUs allocated by the AP in the first trigger frame is 5 .

Optionally, the first trigger frame further includes information used to determine a number m of RUs of the STA scheduled by the AP. m>0, and m is an integer. The RU of the STA scheduled by the AP is an RU that is allocated by the AP to the STA and used to perform uplink OFDMA transmission.

For example, the information used to determine the number m of RUs of the STA scheduled by the AP is the user info field in FIG. 2(*b*). The number m of RUs of the STA scheduled by the AP is a number of all user info fields whose AIDs 12 are set to an AID of the STA in the first trigger frame. In other words, the number m of RUs of the STA scheduled by the AP is a number of all AID 12 fields that are set to the AID of the STA in the first trigger frame. Optionally, one STA may have one or more AIDs.

For example, the AID of the STA is 100. There are two user info fields in the first trigger frame whose AIDs 12 are 100. When the AIDs 12 are the AID of the STA, one RU is indicated by the RU allocation field. Therefore, in the first trigger frame, the number m of RUs of the STA scheduled by the AP is a number of user info fields whose AIDs 12 is 100, to be specific, the number m of RUs of the STA scheduled by the AP is 2.

For example, the AP may periodically send a trigger frame to the STA, or may send a trigger frame to the STA based on a scheduling rule. In trigger frames sent by the AP to the STA at different moments, the number k of RA-RUs allocated by the AP and the number m of RUs scheduled by the AP dynamically change.

S502: The STA receives the first trigger frame sent by the AP.

For example, the STA receives the first trigger frame sent by the AP. The STA may determine, based on the first trigger frame, the number k of RA-RUs allocated by the AP.

Optionally, when the first trigger frame further includes the information used to determine the number m of RUs of the STA scheduled by the AP, the STA may determine, based on the first trigger frame, the number m of RUs allocated by the AP to the STA for OFDMA transmission.

S503: When the STA determines that a first parameter is greater than or equal to a value of an OBO counter, the STA sets the value of the OBO counter to 0, and the STA randomly selects i RA-RUs from the k RA-RUs to send uplink data, where i≤n.

The first parameter is associated with k. For example, the first parameter may be calculated based on k, or a value of the first parameter may be calculated based on k and another parameter, or the like. Optionally, the first parameter may be less than or equal to k.

The first parameter in step S503 may have different values. A backoff speed of the OBO counter varies with different values of the first parameter. The following uses three implementations as an example to describe a specific implementation of step S503 when the first parameter has different values.

In a first implementation, the first parameter may be obtained through calculation based on k and n. For example, the first parameter is $\lfloor k/n \rfloor$, and $\lfloor X \rfloor$ indicates rounding down the real number X.

For example, a number n of RUs supported by the STA is 3, the number k of RA-RUs allocated by the AP in the first trigger frame is 9, and the value of the OBO counter is 2. The STA determines that the first parameter $\lfloor k/n \rfloor$ is greater than or equal to the value 2 of the OBO counter, and the STA sets the value of the OBO counter to 0. The STA randomly selects a maximum of three RA-RUs from the nine RA-RUs based on a data amount of the uplink data transmitted by the STA to send the uplink data. When the number of RUs of the STA scheduled by the AP in the first trigger frame is m, the STA selects a maximum of 3−m RA-RUs from the k RA-RUs to send the uplink data.

In this implementation, compared with the conventional technology in which k is compared with a value of an OBO counter, a backoff speed of the OBO is reduced. This ensures random access fairness between a STA supporting a plurality of RUs and a STA supporting only a single RU. In addition, compared with the conventional technology, the STA in this embodiment supports a plurality of RUs. This improves spectral efficiency and network throughput, and improves network performance.

In a second implementation, the first trigger frame further includes the information used to determine the number m of RUs of the STA scheduled by the AP, and the first parameter may be obtained through calculation based on k, n, and m. For example, the first parameter is $\lfloor k/(n-m) \rfloor$, and $\lfloor X \rfloor$ indicates rounding down the real number X.

For example, the number n of RUs supported by the STA is 3, the number k of RA-RUs allocated by the AP in the first trigger frame is 9, the number m of RUs of the STA scheduled by the AP is 1, and the value of the OBO counter is 2. The STA determines that the first parameter $\lfloor k/(n-m) \rfloor$ is greater than or equal to the value 2 of the OBO counter, and the STA sets the value of the OBO counter to 0. The STA randomly selects a maximum of 3−m (that is, 2) RA-RUs from the nine RA-RUs based on the data amount of the uplink data transmitted by the STA to send the uplink data.

It may be understood that, in this embodiment, the STA supports n resource units RUs, to be specific, the STA sends the uplink data by using a maximum of n RUs. When the number of RUs allocated to the STA to perform OFDMA uplink transmission is m, the STA sends the uplink data by using the m RUs scheduled by the AP. Therefore, an actual capability of the STA to perform UORA is only n−m. To be specific, the STA can contend for a maximum of n−m RA-RUs to send the uplink data.

In this implementation, compared with the conventional technology in which k is compared with the value of the OBO counter, the backoff speed of the OBO is reduced. This ensures random access fairness between the STA supporting a plurality of RUs and a STA supporting only the single RU. In addition, compared with the conventional technology, the STA in this embodiment supports a plurality of RUs. This improves spectral efficiency and network throughput, and improves network performance.

In a third implementation, the first parameter is k.

For example, the number n of RUs supported by the STA is 3, the number k of RA-RUs allocated by the AP in the first trigger frame is 9, and the value of the OBO counter is 2. The STA determines that the first parameter k is greater than or equal to the value 2 of the OBO counter, and the STA sets the value of the OBO counter to 0. The STA randomly selects a maximum of three RA-RUs from the nine RA-RUs based on a data amount of the uplink data transmitted by the STA to send the uplink data. In the first trigger frame, when the number of RUs of the STA scheduled by the AP is m, the STA selects a maximum of n−m RA-RUs from the k RA-RUs to send the uplink data.

For another example, the number n of RUs supported by the STA is 3, the number k of RA-RUs allocated by the AP in the first trigger frame is 9, the number m of RUs of the STA scheduled by the AP is 1, and the value of the OBO counter is 2. The STA determines that the first parameter k is greater than or equal to the value 2 of the OBO counter, and the STA sets the value of the OBO counter to 0. The STA randomly selects a maximum of 3−m (that is, 2) RA-RUs from the nine RA-RUs based on the data amount of the uplink data transmitted by the STA to send the uplink data.

In this implementation, compared with the comparison between k and the value of the OBO counter in the conventional technology, the backoff speed of the OBO keeps unchanged, to be specific, access fairness between the STA supporting a plurality of RUs and the STA supporting only a single RU is not considered. Compared with the conventional technology, in this implementation, the STA supports a plurality of RUs. This improves spectral efficiency and a network throughput, and improves network performance.

Optionally, before steps S501 to S503, the method may further include: The STA receives a UORA parameter setting element sent by the AP. The UORA parameter setting element includes exponent minimum contention window EOCWmin and exponent maximum contention window EOCWmax. The STA may determine the value of the OBO counter based on the UORA parameter setting element. For example, the STA may obtain minimum contention window OCWmin based on exponent minimum contention window EOCWmin. OCWmin=$2^{EOCWmin}$−1. The STA sets OCW to OCWmin, and randomly selects a value from 0 to OCW as the value of the OBO counter.

It should be noted that, when the number of RUs of the STA scheduled by the AP in the first trigger frame is m, in step S503, the STA selects a maximum of n−m RA-RUs from the k RA-RUs to send the uplink data. When k is less than (n−m), the STA sends the uplink data by using a maximum of k RA-RUs in step S503.

This embodiment provides a method for uplink orthogonal frequency division multiple access random access. The AP sends the first trigger frame to the STA. The first trigger frame includes the information used to determine the number k of RA-RUs allocated by the AP. k>0, and k is an integer. The STA receives the first trigger frame sent by the AP. When the STA determines that the first parameter is greater than or equal to the value of the OBO counter, the STA sets the value of the OBO counter to 0. The STA randomly selects a maximum of n RA-RUs from the k RA-RUs to send the uplink data. In this embodiment, when the STA supports a plurality of RUs, a maximum of n RA-RUs are selected to send the uplink data based on a comparison between the first parameter and the value of the OBO counter when backoff of the OBO counter is 0. Compared with the conventional technology, this improves spectral efficiency and network throughput, and improves network performance.

Figure 6:
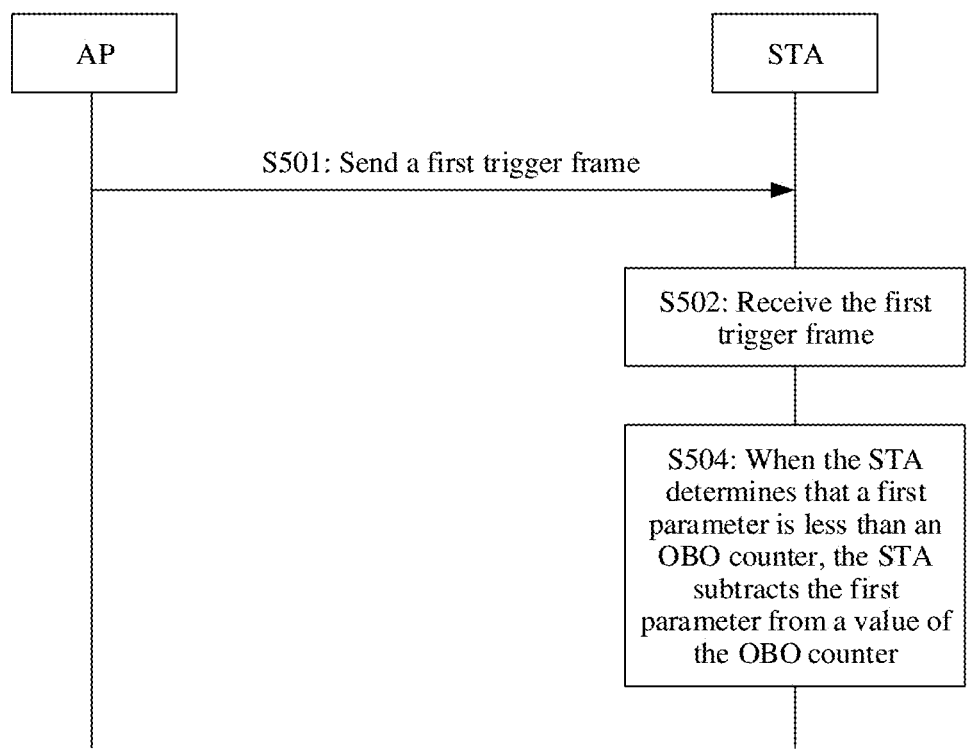
FIG. 6 is a schematic flowchart of another method for uplink orthogonal frequency division multiple access random access according to an embodiment of this application.

For example, this embodiment of this application further provides a method for uplink orthogonal frequency division multiple access random access. As shown in FIG. 6, when the STA determines that the first parameter is less than the OBO counter, the method may further include S504 after steps S501 and S502.

S504: When the STA determines that the first parameter is less than the OBO counter, the STA subtracts the first parameter from the value of the OBO counter.

The first parameter is associated with k. For example, the first parameter may be calculated based on k, or a value of the first parameter may be calculated based on k and another parameter, or the like. Optionally, the first parameter may be less than or equal to k.

The first parameter in step S504 may have different values. A backoff speed of the OBO counter varies with different values of the first parameter. The following uses three implementations as an example to describe a specific implementation of step S504 when the first parameter has different values.

In a first implementation, the first parameter may be obtained through calculation based on k and n. For example, the first parameter is $\lfloor k/n \rfloor$, and $\lfloor X \rfloor$ indicates rounding down the real number X.

For example, the number n of RUs supported by the STA is 3, the number k of RA-RUs allocated by the AP in the first trigger frame is 3, and the value of the OBO counter is 2. The STA determines that the first parameter $\lfloor k/n \rfloor$ is less than the value 2 of the OBO counter, and the STA subtracts 1 from the value 2 of the OBO counter, to be specific, the value of the OBO counter is 1.

In this implementation, compared with that k is subtracted from the value of the OBO counter during backoff in the conventional technology, in this implementation, $\lfloor k/n \rfloor$ is subtracted from the value of the OBO counter during backoff. This reduces the backoff speed of the OBO counter, and ensures random access fairness between the STA supporting a plurality of RUs and the STA supporting only a single RU.

In a second implementation, the first trigger frame further includes the information used to determine the number m of RUs of the STA scheduled by the AP, and the first parameter may be obtained through calculation based on k, n, and m. For example, the first parameter is $\lfloor k/(n-m) \rfloor$, and $\lfloor X \rfloor$ indicates rounding down the real number X.

For example, the number n of RUs supported by the STA is 3, the number k of RA-RUs allocated by the AP in the first trigger frame is 3, the number m of RUs of the STA scheduled by the AP is 1, and the value of the OBO counter is 2. The STA determines that the first parameter $\lfloor k/(n-m) \rfloor$ is less than the value 2 of the OBO counter, and the STA subtracts 1 from the value 2 of the OBO counter, to be specific, the value of the OBO counter is 1.

In this implementation, compared with that k is subtracted from the value of the OBO counter during backoff in the conventional technology, in this implementation, $\lfloor k/(n-m) \rfloor$ is subtracted from the value of the OBO counter during backoff. This reduces the backoff speed of the OBO counter, and ensures random access fairness between the STA supporting a plurality of RUs and the STA supporting only a single RU.

In a third implementation, the first parameter is k.

For example, the number n of RUs supported by the STA is 3, the number k of RA-RUs allocated by the AP in the first trigger frame is 2, and the value of the OBO counter is 3. The STA determines that the first parameter k is less than the value 3 of the OBO counter, and the STA subtracts 2 from the value 3 of the OBO counter, to be specific, the value of the OBO counter is 1.

In this implementation, compared with that k is subtracted from the value of the OBO counter during backoff in the conventional technology, in this implementation, k is also subtracted from the value of the OBO counter during backoff. This keeps the backoff speed of the OBO counter unchanged, and does not consider random access fairness between the STA supporting a plurality of RUs and the STA supporting only a single RU.

This embodiment provides a method for uplink orthogonal frequency division multiple access random access. The AP sends the first trigger frame to the STA. The first trigger frame includes the information used to determine the number k of RA-RUs allocated by the AP. k>0, and k is an integer. The STA receives the first trigger frame sent by the AP. When the STA determines that the first parameter is less than the OBO counter, the STA subtracts the first parameter from the value of the OBO counter. In this embodiment, when the STA supports a plurality of RUs, based on the comparison between the first parameter and the value of the OBO counter, when the first parameter is less than the value of the OBO counter, the STA subtracts the first parameter from the value of the OBO counter. Compared with the conventional technology, in this embodiment, the STA supports a plurality of RUs to transmit the uplink data. This improves spectral efficiency and network throughput, and improves network performance.

Figure 7:
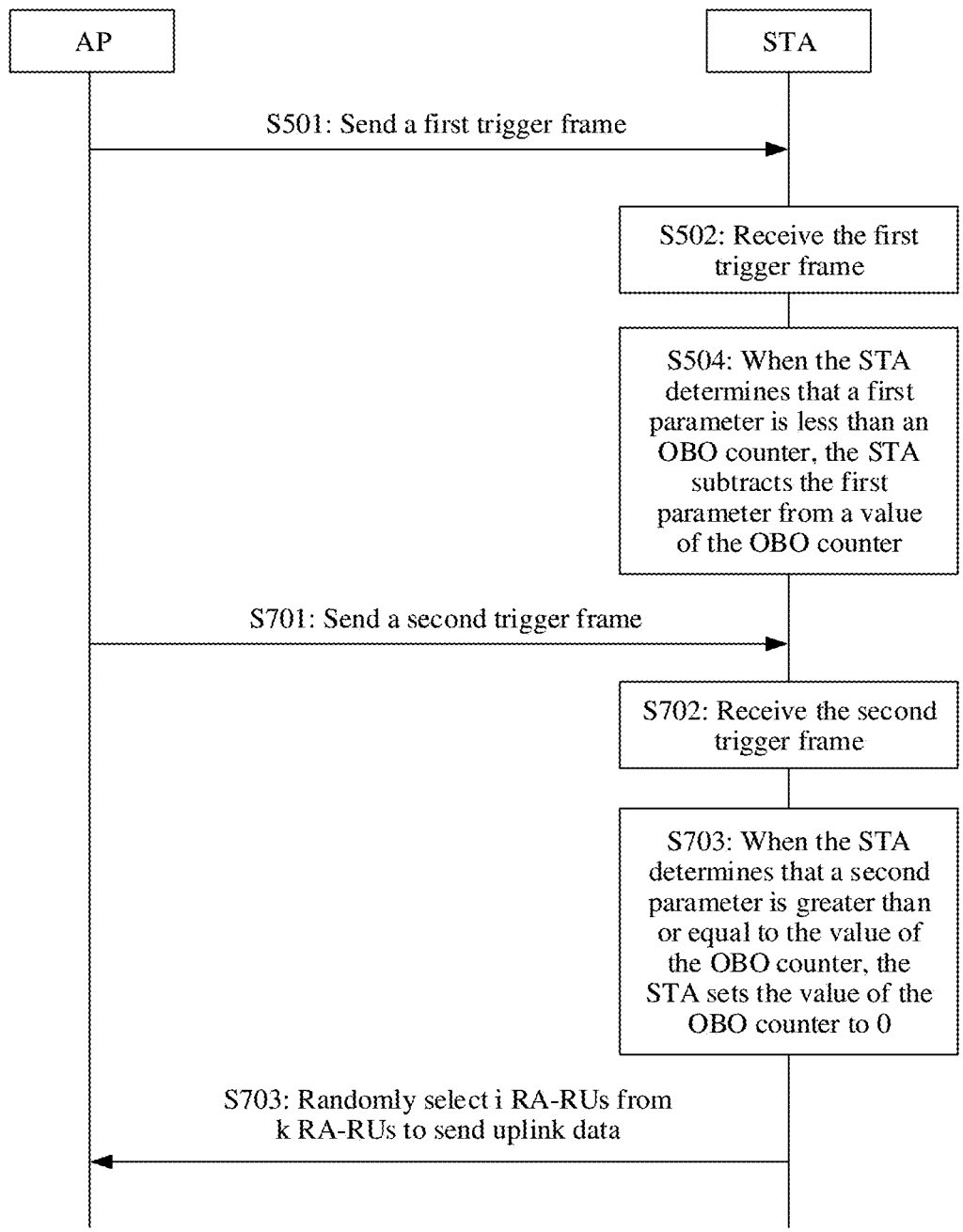
FIG. 7 is a schematic flowchart of another method for uplink orthogonal frequency division multiple access random access according to an embodiment of this application.

For example, an embodiment of this application further provides a method for uplink orthogonal frequency division multiple access random access. As shown in FIG. 7, the method may further include S701 to S703 after step S504.

S701: The AP sends a second trigger frame to the STA, where the second trigger frame includes information used to determine a number k1 of RA-RUs allocated by the AP, k1 >0, and k1 is an integer.

For example, a frame structure of the second trigger frame is shown in FIG. 2(a) to FIG. 2(c). The foregoing information used to determine the number k1 of RA-RUs allocated by the AP may be carried in an RA-RU information field in FIG. 2(b), and specifically, may be carried in a number of RA-RU field in FIG. 2(c). The number k1 of RA-RUs allocated by the AP is a sum of numbers of RA-RUs indicated by number of RA-RU fields in all user info fields whose AID 12 is 0 or 2045 in the second trigger frame.

Optionally, the second trigger frame further includes information used to determine a number m1 of RUs of the STA scheduled by the AP. m1>0, and m1 is an integer. For example, the number m1 of RUs of the STA scheduled by the AP is a number of all user info fields whose AID 12 fields are set to an AID of the STA in the second trigger frame.

S702: The STA receives the second trigger frame.

For example, the STA receives the second trigger frame sent by the AP. The STA may determine, based on the second trigger frame, the number k1 of RA-RUs allocated by the AP.

Optionally, when the second trigger frame further includes the information used to determine the number m1 of RUs of the STA scheduled by the AP, the STA may determine, based on the second trigger frame, the number m1 of RUs of the STA scheduled by the AP.

S703: When the STA determines that a second parameter is greater than or equal to the value of the OBO counter, the STA sets the value of the OBO counter to 0, and the STA randomly selects i1 RA-RUs from the k1 RA-RUs to send the uplink data, where i1≤n, and (k mod n) indicates a remainder of k divided by n.

The second parameter in step S703 corresponds to the value of the first parameter in step S504. The following specifically describes a value of the second parameter and an implementation of step S703 when the value of the first parameter in step S504 is different.

In a first implementation, when the first parameter in step S504 is $\lfloor k/n \rfloor$, the second parameter in step S703 is $\lfloor [k1+(k \bmod n)]/(n) \rfloor$.

For example, in this implementation, the remainder of k in the first trigger frame divided by n is added to a total number of RA-RUs in the second trigger frame. To be specific, the number of RA-RUs in the second trigger frame is compensated, to avoid a problem that a backoff speed of the STA is excessively slow when a number of RA-RUs allocated by the AP is less than an actual capability of the STA, or when a large number of RUs are scheduled by the AP. Specifically, on the basis of the number k1 of RA-RUs allocated by the AP in the second trigger frame, the remainder of k divided by n is added, n is rounded down, and then the result is compared with the value of the OBO counter.

It should be noted that, in this application, the value of the OBO counter is continuously updated, and the value of the OBO counter is a current value of the OBO counter. For example, the value of the OBO counter in step S703 is a value obtained after the STA subtracts the first parameter from the value of the OBO counter in step S504.

In a second implementation, when the first parameter in step S504 is $\lfloor k/(n-m) \rfloor$, the second parameter in step S703 is $\lfloor \{k1+[k \bmod (n-m)]\}/(n-m1) \rfloor$.

For example, in this implementation, a remainder of k in the first trigger frame divided by (n−m) is added to the total number of RA-RUs in the second trigger frame. To be specific, the number of RA-RUs in the second trigger frame is compensated, to accelerate the backoff speed of the OBO counter. Specifically, on the basis of the number k1 of RA-RUs allocated by the AP in the second trigger frame, the remainder of k divided by (n−m) is added, (n−m1) is rounded down, and then the result is compared with the value of the OBO counter.

It should be noted that, when the number of RUs of the STA scheduled by the AP in the second trigger frame is m1, in step S703, the STA selects a maximum of n−m1 RA-RUs from the k1 RA-RUs to send the uplink data. When k1 is less than (n−m1), the STA sends the uplink data by using a maximum of k1 RA-RUs in step S703.

It may be understood that for a specific implementation and beneficial effects of step S703, refer to related descriptions in step S503, and details are not described herein again.

According to the method for uplink orthogonal frequency division multiple access random access provided in this embodiment of this application, the AP sends the first trigger frame to the STA. The first trigger frame includes the information used to determine the number k of RA-RUs allocated by the AP. k>0, and k is an integer. The STA receives the first trigger frame sent by the AP. When the STA determines that the first parameter is less than the OBO counter, the STA subtracts the first parameter from the value of the OBO counter. The AP sends the second trigger frame to the STA. The second trigger frame includes the information used to determine the number k1 of RA-RUs allocated by the AP. k1>0, and k1 is an integer. The STA receives the second trigger frame. When the STA determines that the second parameter is greater than or equal to the value of the OBO counter, the STA sets the value of the OBO counter to 0. The STA randomly selects the i1 RA-RUs from the k1 RA-RUs to send the uplink data. i1≤n. In this embodiment, when the STA supports a plurality of RUs and the STA determines that the first parameter is less than the OBO counter, a maximum of n RA-RUs are selected to send the uplink data based on a comparison between the second parameter and the value of the OBO counter when backoff of the OBO counter is 0. Compared with the conventional technology, in this embodiment, the STA supports a plurality of RUs to transmit the uplink data. This improves spectral efficiency and network throughput, and improves network performance. In addition, the number of RA-RUs in the trigger frame is compensated, to accelerate the backoff speed of the OBO counter.

Figure 8:
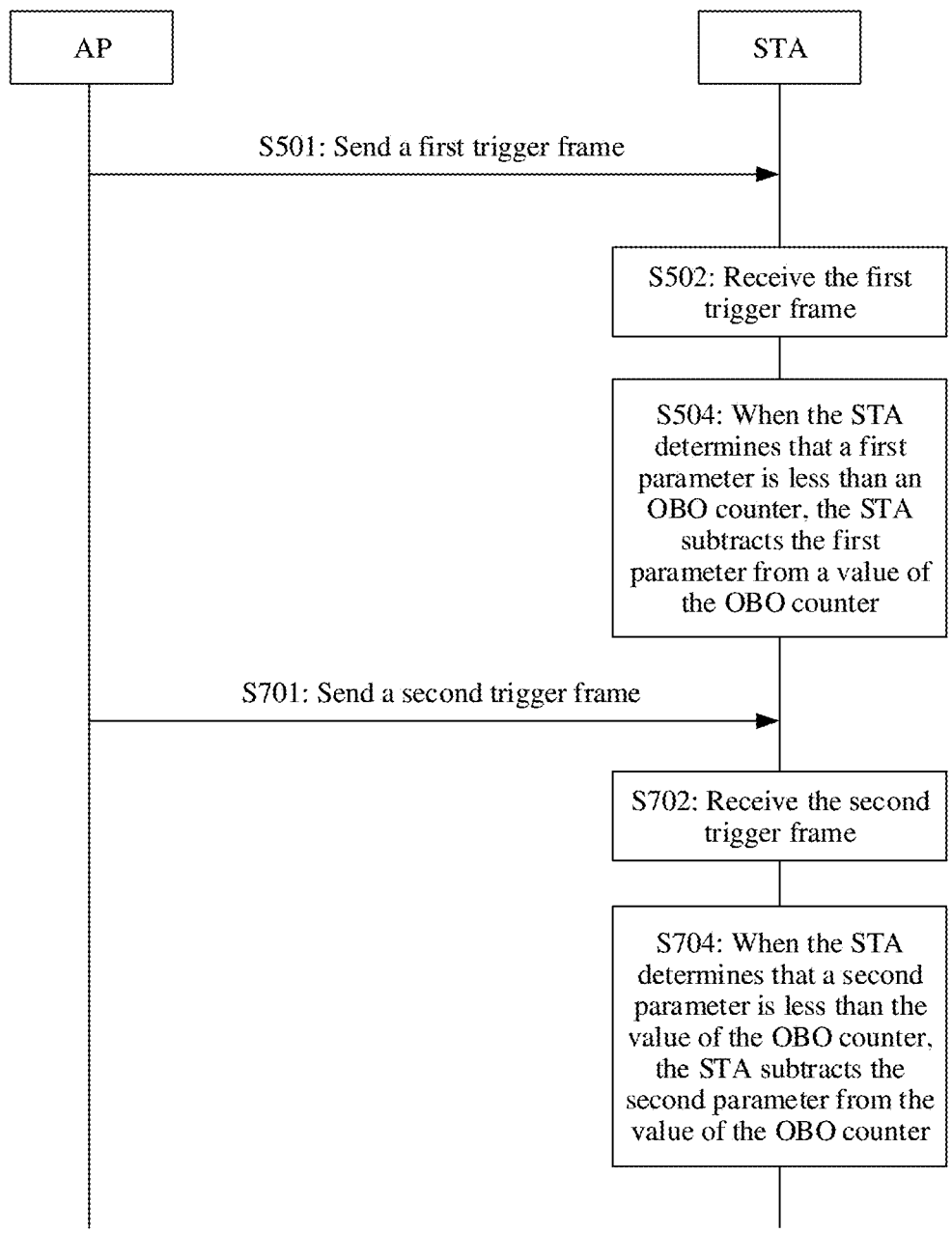
FIG. 8 is a schematic flowchart of another method for uplink orthogonal frequency division multiple access random access according to an embodiment of this application.

For example, this embodiment of this application further provides a method for uplink orthogonal frequency division multiple access random access. As shown in FIG. 8, when the STA determines that the second parameter is less than the OBO counter, the method may further include S704 after steps S701 and S702.

S704: When the STA determines that the second parameter is less than the value of the OBO counter, the STA subtracts the second parameter from the value of the OBO counter.

The second parameter in step S704 corresponds to the value of the first parameter in step S504. The following specifically describes a value of the second parameter and an implementation of step S704 when the value of the first parameter in step S504 is different.

In a first implementation, when the first parameter in step S504 is $\lfloor k/n \rfloor$, the second parameter in step S704 is $\lfloor [k1+(k \bmod n)]/(n) \rfloor$.

In a second implementation, when the first parameter in step S504 is $\lfloor k/(n-m) \rfloor$, the second parameter in step S704 is $\lfloor \{k1+[k \bmod (n-m)]\}/(n-m1) \rfloor$.

It may be understood that for a specific implementation and beneficial effects of step S704, refer to related descriptions in step S504, and details are not described herein again.

According to the method for uplink orthogonal frequency division multiple access random access provided in this embodiment of this application, the AP sends the first trigger frame to the STA. The first trigger frame includes the information used to determine the number k of RA-RUs allocated by the AP. k>0, and k is an integer. The STA receives the first trigger frame sent by the AP. When the STA determines that the first parameter is less than the OBO counter, the STA subtracts the first parameter from the value of the OBO counter. The AP sends the second trigger frame to the STA. The second trigger frame includes the information used to determine the number k1 of RA-RUs allocated by the AP. k1>0, and k1 is an integer. The STA receives the second trigger frame. When the STA determines that the second parameter is less than the value of the OBO counter, the STA subtracts the second parameter from the value of the OBO counter. In this embodiment, when the STA supports a plurality of RUs and the STA determines that the first parameter is less than the OBO counter, based on a comparison between the second parameter and the value of the OBO counter, when the second parameter is less than the OBO counter, the STA subtracts the second parameter from the value of the OBO counter. Compared with the conventional technology, in this embodiment, the STA supports a plurality of RUs to transmit the uplink data. This improves spectral efficiency and network throughput, and improves network performance. In addition, the number of RA-RUs in the trigger frame is compensated, to accelerate the backoff speed of the OBO counter.

It should be noted that after the foregoing steps S501 to S504, when the AP sends a trigger frame to the STA again, the AP may continue to repeatedly perform steps S501 to S504, or may repeatedly perform steps S701 to S704. This is not limited in this embodiment of this application.

Figure 9:
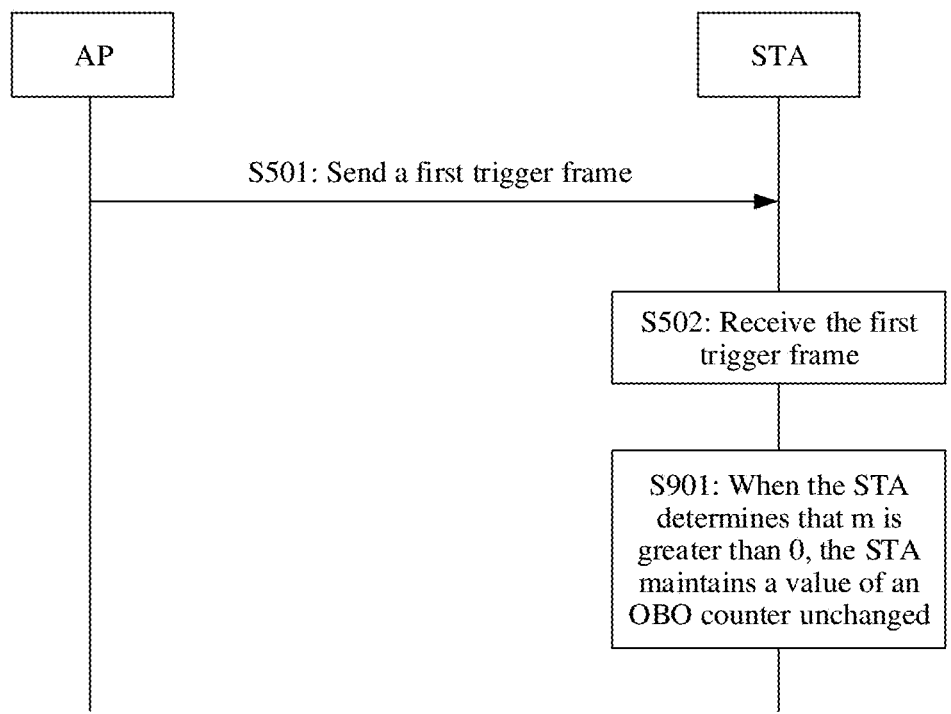
FIG. 9 is a schematic flowchart of another method for uplink orthogonal frequency division multiple access random access according to an embodiment of this application.

Optionally, an embodiment of this application further provides a method for uplink orthogonal frequency division multiple access random access. As shown in FIG. 9, when the first trigger frame further includes the information used to determine the number m of RUs of the STA scheduled by the AP, the method may further include S901 after steps S501 and S502.

S901: When the STA determines that m is greater than 0, the STA keeps the value of the OBO counter unchanged.

For example, when the STA determines that m is greater than 0, it indicates that the AP schedules m RUs of the STA. Therefore, an actual capability of the STA to perform UORA is (n−m), to be specific, the STA contends for a maximum of (n−m) RA-RUs to transmit the uplink data. In this case, because the STA can contend for the maximum of (n−m) RA-RUs to transmit the uplink data, to avoid that when performing backoff at a slow backoff speed, the STA supporting a plurality of RUs can only select a small number of RA-RUs to perform UORA, the STA may choose not to perform a backoff procedure in this case, in other words, the STA keeps the value of the OBO counter unchanged, and the backoff procedure is simple. Optionally, the STA may perform the backoff procedure when the AP does not schedule the RU.

Optionally, in step S901, when the STA determines that m is greater than or equal to a first preset threshold, the STA keeps the value of the OBO counter unchanged. The first preset threshold is greater than 0 and less than or equal to n.

According to the method for uplink orthogonal frequency division multiple access random access provided in this embodiment, the AP sends the first trigger frame to the STA. The first trigger frame includes the information used to determine the number k of RA-RUs allocated by the AP. k>0, and k is an integer. The STA receives the first trigger frame sent by the AP. When the STA determines that m is greater than 0, the STA keeps the value of the OBO counter unchanged. In this embodiment, when the STA supports a plurality of RUs and the STA determines that m is greater than 0, the STA does not perform the backoff procedure to keep the value of the OBO counter unchanged. Compared with the conventional technology, in this embodiment, the STA supports a plurality of RUs to transmit the uplink data. This improves spectral efficiency and network throughput, and improves network performance.

Figure 10:
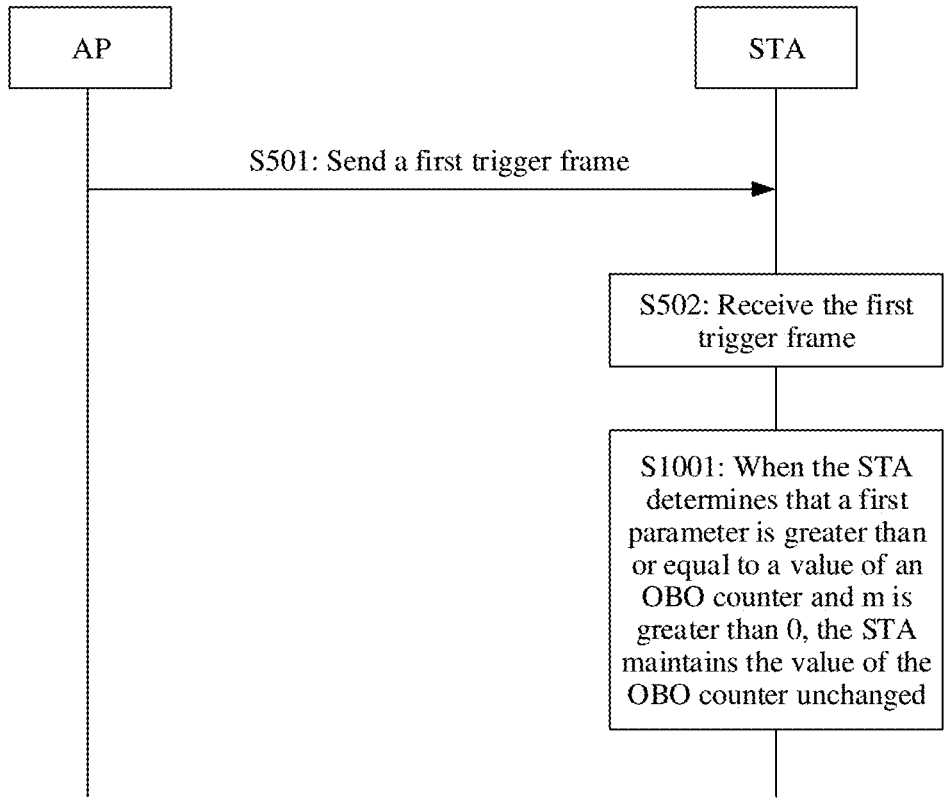
FIG. 10 is a schematic flowchart of another method for uplink orthogonal frequency division multiple access random access according to an embodiment of this application.

Optionally, an embodiment of this application further provides a method for uplink orthogonal frequency division multiple access random access. As shown in FIG. 10, when the first trigger frame further includes the information used to determine the number m of RUs of the STA scheduled by the AP, the method may further include S1001 after steps S501 and S502.

S1001: When the STA determines that the first parameter is greater than or equal to the value of the OBO counter and m is greater than 0, the STA keeps the value of the OBO counter unchanged.

It may be understood that, for a specific implementation in which the first parameter and the STA determines that the first parameter is greater than or equal to the value of the OBO counter, refer to related descriptions in step S503, and details are not described herein again.

For example, when the STA determines that the first parameter is greater than or equal to the value of the OBO counter, if a backoff procedure is performed, the STA sets the value of the OBO counter to 0. However, because m is greater than 0, to be specific, an actual capability of the STA to perform UORA is (n−m), the STA contends for a maximum of (n−m) RA-RUs to transmit the uplink data. Therefore, to avoid that when performing backoff at a slow backoff speed, the STA supporting a plurality of RUs can only select a small number of RA-RUs to perform UORA, the STA may choose not to perform the backoff procedure in this case, in other words, the STA keeps the value of the OBO counter unchanged.

Optionally, in step S1001, when the STA determines that the first parameter is greater than or equal to the value of the OBO counter, and m is greater than or equal to a first preset threshold, the STA keeps the value of the OBO counter unchanged. The first preset threshold is greater than 0 and less than or equal to n. To be specific, the actual capability of the STA to perform UORA is (n−m). Because m is large, a number of RA-RUs that the STA contends for is small. Therefore, the STA may not perform the backoff procedure.

According to the method for uplink orthogonal frequency division multiple access random access provided in this embodiment, the AP sends the first trigger frame to the STA. The first trigger frame includes the information used to determine the number k of RA-RUs allocated by the AP. k>0, and k is an integer. The STA receives the first trigger frame sent by the AP. When the STA determines that the first parameter is greater than or equal to the value of the OBO counter and m is greater than 0, the STA keeps the value of the OBO counter unchanged. In this embodiment, when the STA supports a plurality of RUs and the STA determines that the first parameter is greater than or equal to the value of the OBO counter and m is greater than 0, the STA does not perform the backoff procedure, and keeps the value of the OBO counter unchanged. Compared with the conventional technology, in this embodiment, the STA supports a plurality of RUs to transmit the uplink data. This improves spectral efficiency and network throughput, and improves network performance.

Figure 11:
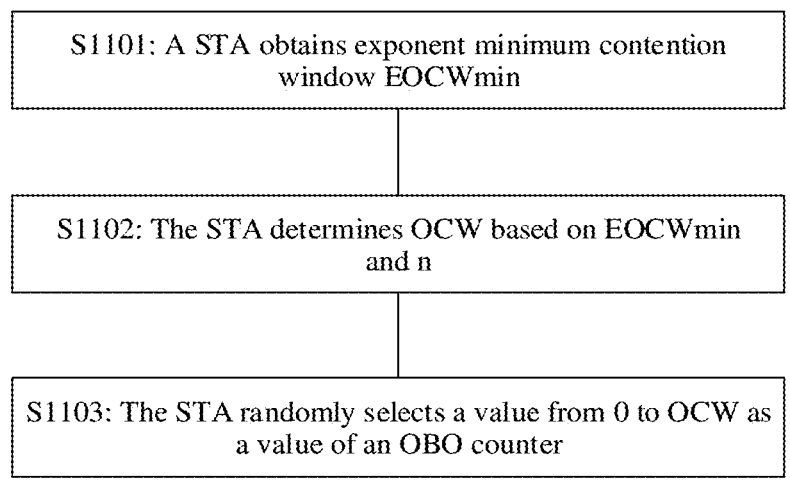
FIG. 11 is a schematic flowchart of another method for uplink orthogonal frequency division multiple access random access according to an embodiment of this application.

An embodiment of this application further provides a method for uplink orthogonal frequency division multiple access random access. In the method, a STA supports n resource units RUs, n>1, and n is an integer. As shown in FIG. 11, the method includes steps S1101 to S1103.

S1101: The STA obtains exponent minimum contention window EOCWmin.

For example, that the STA obtains exponent minimum contention window EOCWmin may include: The STA receives UORA parameter set information (UORA parameter set element) sent by an AP, to obtain exponent minimum contention window EOCWmin. The UORA parameter set information includes exponent minimum contention window EOCWmin. Optionally, the UORA parameter set information further includes exponent maximum contention window EOCWmax.

For example, the UORA parameter set information may be carried in a beacon (Beacon) frame, a probe response (probe response) frame, or a (re)association response ((Re) association response) frame.

S1102: The STA determines OCW based on EOCWmin and n.

For example, that the STA determines OCW based on EOCWmin and n may include: The STA obtains minimum contention window OCWmin based on EOCWmin. OCWmin=$2^{EOCWmin}-1$. The STA determines OCW based on minimum contention window OCWmin and n. It may be understood that a formula for determining OCW may be represented by OCWmin and n, or may be represented by EOCWmin and n.

For example, that the STA determines OCW based on EOCWmin and n includes: determining OCW according to the following formula:

OCW=*$n(2^{EOCWmin}-1)$, or OCW=$2^{EOCWmin+n-1}-1$.

It may be understood that the foregoing formula for determining OCW may have a plurality of variations in a form, and all are equivalent variations of the foregoing formula. For example, OCW may also be determined according to the formula: OCW=n*OCWmin, or OCW=$2^{log\ 2(OCWmin+1)*n-1}-1$. A specific form of the formula for determining OCW is not limited in this embodiment of this application.

It should be noted that, compared with setting OCWmin to OCW in the conventional technology, a value of OCW is increased in this embodiment of this application.

S1103: The STA randomly selects a value from 0 to OCW as the value of the OBO counter.

For example, in this embodiment of this application, compared with setting OCWmin to OCW in the conventional technology, the value of OCW is increased. Therefore, the value of the OBO counter randomly selected from 0 to OCW is also increased. This ensures random access fairness between a STA supporting a plurality of RUs and a STA supporting only a single RU while keeping a backoff speed of the OBO counter unchanged.

This embodiment of this application provides a method for uplink orthogonal frequency division multiple access random access. Exponent minimum contention window EOCWmin is obtained by using the STA. The STA determines OCW based on EOCWmin and n. The STA randomly selects a value from 0 to OCW as the value of the OBO counter. In this embodiment, the value of OCW is increased, and the value of the OBO counter is also correspondingly increased. This ensures random access fairness between the STA supporting a plurality of RUs and the STA supporting only a single RU while keeping the backoff speed of the OBO counter unchanged. In this embodiment, the STA supports a plurality of RUs to transmit uplink data. This improves spectral efficiency and network throughput, and improves network performance.

Optionally, after the STA sends data by using one RA-RU, if the data is successfully sent, the STA sets OCW to OCWmin, and continues to perform UORA. If the data fails to be sent and OCW<OCWmax, OCW is updated to 2*OCW+1. If the data fails to be sent but OCW=OCWmax, OCW keeps unchanged until the data is sent successfully and OCW is set to OCWmin. Because the value of OCW is increased in the foregoing steps S1101 to S1103, it is possible that the value of OCW reaches OCWmax when a number of times of sending failures is small. Therefore, to solve this problem, the STA may increase an upper limit value of OCW accordingly.

Figure 12:
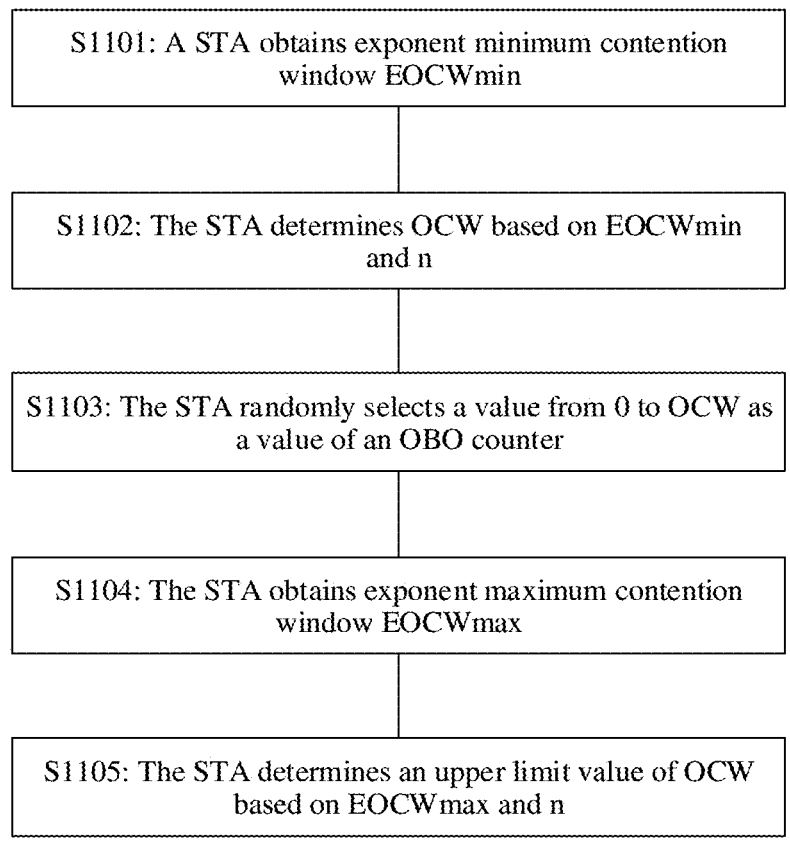
FIG. 12 is a schematic flowchart of another method for uplink orthogonal frequency division multiple access random access according to an embodiment of this application.

For example, an embodiment of this application provides another method for uplink orthogonal frequency division multiple access random access. As shown in FIG. 12, the method may further include S1104 and S1105 after step S1101 to S1103.

S1104: The STA obtains exponent maximum contention window EOCWmax.

For example, that the STA obtains exponent maximum contention window EOCWmax may include: The STA receives the UORA parameter set information (UORA parameter set element) sent by the AP, to obtain exponent maximum contention window EOCWmax.

Step S1104 and step S1101 may be a same step, that is, the STA receives the UORA parameter setting information sent by the AP, to obtain exponent minimum contention window EOCWmin and exponent maximum contention window EOCWmax.

S1105: The STA determines the upper limit value of OCW based on EOCWmax and n.

For example, that the STA determines OCW based on EOCWmax and n may include: The STA obtains minimum contention window OCWmax based on EOCWmax. OCWmax=$2^{EOCWmax}-1$. The STA determines the upper limit value of OCW based on maximum contention window OCWmax and n. It may be understood that a formula for determining the upper limit value of OCW may be represented by OCWmax and n, or may be represented by EOCWmax and n.

That the STA determines the upper limit value of OCW based on EOCWmax and n may include: The STA sets OCWmax to n*$(2^{EOCWmax}-1)$ or $2^{EOCWmax+n-1}-1$, or the STA sets the upper limit value of OCW to n*$(2^{EOCWmax}-1)$ or $2^{EOCWmax+n-1}-1$.

It may be understood that the foregoing formula for determining the upper limit value of OCW may have a plurality of variations in a form, and all are equivalent variations of the foregoing formula. For example, the STA sets OCWmax to n*OCW max or $2^{log\ 2(OCWmax+1)*n-1}-1$, or the STA sets the upper limit of OCW to n*OCWmax or $2^{log\ 2(OCWmax+1)*n-1}-1$. A specific form of the formula for determining the upper limit value of OCW is not limited in this embodiment of this application.

It should be noted that in this embodiment, when the value of OCW is increased, the upper limit value of OCW is correspondingly increased, so that a UORA mechanism can be more properly executed when the STA supports a plurality of RUs.

It may be understood that a sequence of steps S1102 and S1103 and step S1105 is not limited in this embodiment of this application. For example, steps S1102 and S1103 may be performed before step S1105, may be performed after step S1105, or may be performed simultaneously with step S1105.

It should be noted that, in this embodiment of this application, the STA may determine that transmission fails when no acknowledgment message sent by the AP is received in response to the uplink data transmitted by all RA-RUs. Alternatively, the STA may determine that transmission fails, when the acknowledgement message sent by the AP is not received in response to the uplink data transmitted by at least one RA-RU. The acknowledgment message is used to indicate that the AP successfully receives data transmitted by the RA-RU. When determining that transmission fails, the STA doubles the value of OCW, for example, updates the value of OCW to 2*OCW+1.

Figure 13:
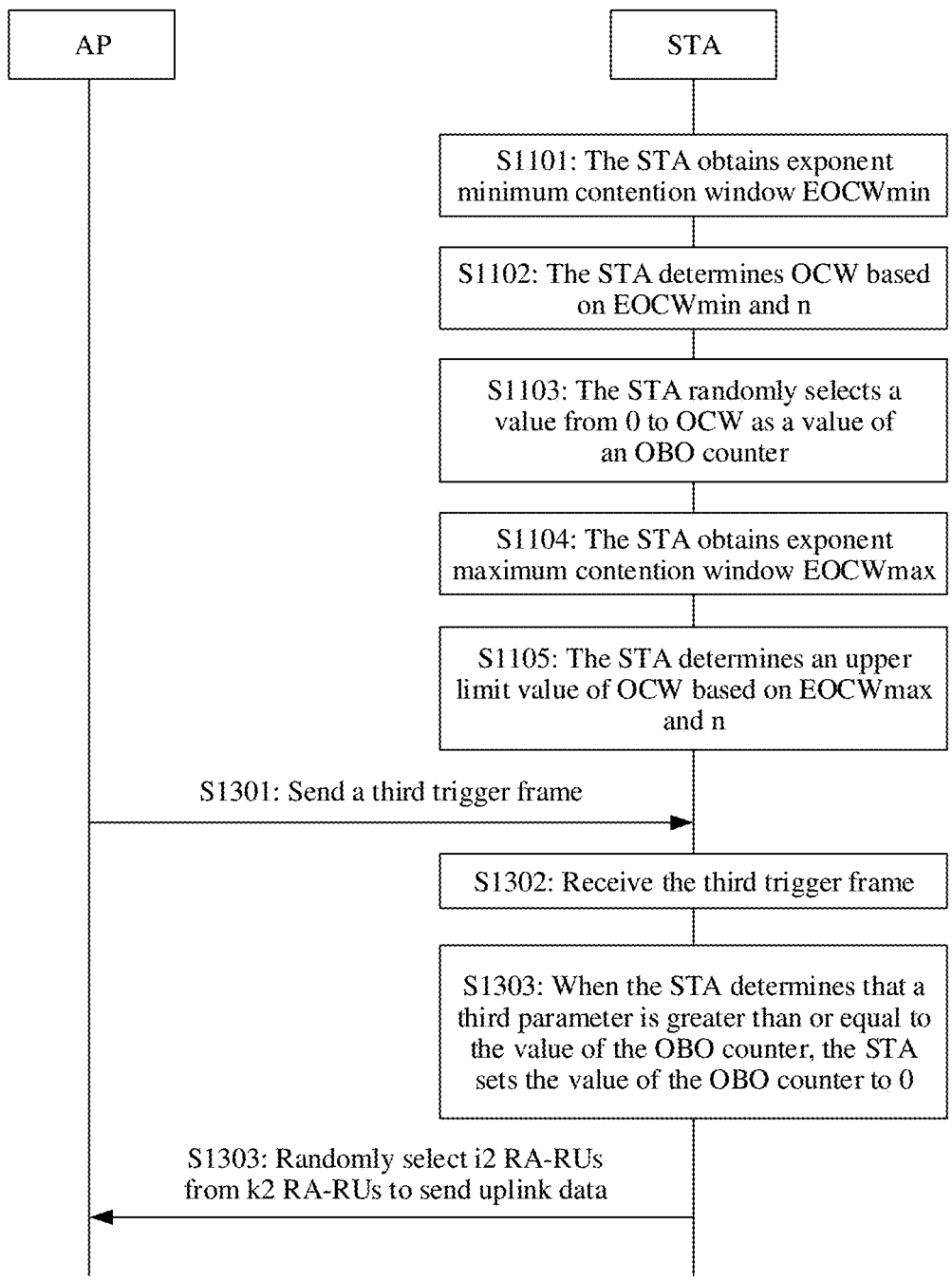
FIG. 13 is a schematic flowchart of another method for uplink orthogonal frequency division multiple access random access according to an embodiment of this application.

An embodiment of this application further provides a method for uplink orthogonal frequency division multiple access random access. As shown in FIG. 13, based on steps S1101 to S1105, the method may further include S3301 to S1303.

S1301: The AP sends a third trigger frame to the STA, where the third trigger frame includes information used to determine a number k2 of RA-RUs allocated by the AP, k2>0, and k2 is an integer.

For example, a frame structure of the third trigger frame is shown in FIG. 2(a) to FIG. 2(c). The foregoing information used to determine the number k2 of RA-RUs allocated by the AP may be carried in an RA-RU information (RA-RU Information) field in FIG. 2(b), and specifically, may be carried in a number of RA-RU field in FIG. 2(c). The number k2 of RA-RUs allocated by the AP is a sum of numbers of RA-RUs indicated by number of RA-RU fields in all user info fields whose AID 12 is 0 or 2045 in the third trigger frame.

Optionally, the third trigger frame further includes information used to determine a number m2 of RUs of the STA scheduled by the AP. m2>0, and m2 is an integer. For example, the number m2 of RUs of the STA scheduled by the AP is a number of all user info fields whose AID 12 fields are set to an AID of the STA in the third trigger frame.

S1302: The STA receives the third trigger frame.

For example, the STA receives the third trigger frame sent by the AP. The STA may determine, based on the third trigger frame, the number k2 of R-RUs allocated by the AP.

Optionally, when the third trigger frame further includes the information used to determine the number m2 of RUs of the STA scheduled by the AP, the STA may determine, based on the third trigger frame, the number m2 of RUs of the STA scheduled by the AP.

S1303: When the STA determines that a third parameter is greater than or equal to the value of the OBO counter, the STA sets the value of the OBO counter to 0, and the STA randomly selects i2 RA-RUs from the k2 RA-RUs to send the uplink data, where i2≤n.

The third parameter is associated with k2. For example, the third parameter may be calculated based on k2, or a value of the third parameter may be calculated based on k2 and another parameter, or the like.

The third parameter in step S1303 may have different values. A backoff speeds of the OBO counter varies with different values of the third parameter. The following uses two implementations as an example to describe a specific implementation of step S1303 when the third parameter has different values.

In a first implementation, the third parameter is k2.

For example, the number n of RUs supported by the STA is 3, the number k2 of RA-RUs allocated by the AP in the third trigger frame is 9, and the value of the OBO counter is 8. The STA determines that the third parameter k2 is greater than or equal to the value 8 of the OBO counter, and the STA sets the value of the OBO counter to 0. The STA randomly selects a maximum of three RA-RUs from the nine RA-RUs based on a data amount of the uplink data transmitted by the STA to send the uplink data. When the number of RUs scheduled by the AP in the third trigger frame is m2, the STA selects a maximum of n−m2 RA-RUs from the k2 RA-RUs to send the uplink data.

In this implementation, compared with setting OCWmin to OCW in the conventional technology, in this embodiment, the value of OCW is increased by using steps S1101 to S1103. Therefore, the value of the OBO counter randomly selected from 0 to OCW is also increased. Therefore, even though k2 is compared with the value of the OBO counter during backoff in this implementation, because the value of the OBO counter is increased, the overall backoff speed of the OBO counter becomes slower. This ensures random access fairness between the STA supporting a plurality of RUs and the STA supporting only a single RU.

In a second implementation, the third parameter may be obtained through calculation based on k2, n, and m2. For example, the third parameter is ⌊k2*n/(n−m2)⌋, and ⌊X⌋ indicates rounding down the real number X.

For example, the number n of RUs supported by the STA is 3, the number k2 of RA-RUs allocated by the AP in the third trigger frame is 9, the number m2 of RUs of the STA scheduled by the AP is 1, and the value of the OBO counter is 8. The STA determines that the third parameter ⌊k2*n/(n−m2)⌋ is greater than or equal to the value 8 of the OBO counter, and the STA sets the value of the OBO counter to 0. The STA randomly selects a maximum of n−m2 (that is, 2) RA-RUs from the nine RA-RUs based on the data amount of the uplink data transmitted by the STA to send the uplink data.

It may be understood that, in this embodiment, the STA supports n resource units RUs, to be specific, the STA sends the uplink data by using a maximum of n RUs. When the number of RUs of the STA scheduled by the AP is m2, the STA sends the uplink data by using the m2 RUs scheduled by the AP. Therefore, an actual capability of the STA to perform UORA is only n−m2. To be specific, the STA can contend for a maximum of n−m2 RA-RUs to send the uplink data.

In this implementation, compared with setting OCWmin to OCW in the conventional technology, in this embodiment, the value of OCW is increased by using steps S1101 to S1103. Therefore, the value of the OBO counter randomly selected from 0 to OCW is also increased. Compared with the previous implementation, because the actual capability of the STA is (n−m2) less than n, the backoff speed of the OBO counter may be correspondingly increased, so that the backoff speed of the OBO counter is increased by n/(n−m2).

It should be noted that, when the number of RUs of the STA scheduled by the AP in the third trigger frame is m2, in step S1303, the STA selects a maximum of n−m2 RA-RUs from the k2 RA-RUs to send the uplink data. When k2 is less than (n−m2), the STA sends the uplink data by using a maximum of k2 RA-RUs in step S1303.

This embodiment provides a method for uplink orthogonal frequency division multiple access random access. Exponent minimum contention window EOCWmin is obtained by using the STA. The STA determines OCW based on EOCWmin and n. The STA randomly selects a value from 0 to OCW as the value of the OBO counter. The AP sends the third trigger frame to the STA. The third trigger frame includes the information used to determine the number k2 of RA-RUs allocated by the AP. k2>0, and k2 is an integer. The STA receives the third trigger frame. When the STA determines that the third parameter is greater than or equal to the value of the OBO counter, the STA sets the value of the OBO counter to 0. The STA randomly selects the i2 RA-RUs from the k2 RA-RUs to send the uplink data. i2≤n. In this embodiment, the value of OCW is increased, and the value of the OBO counter is also correspondingly increased. This ensures random access fairness between the STA supporting a plurality of RUs and the STA supporting only a single RU while keeping the backoff speed of the OBO counter unchanged. In this embodiment, the STA supports a plurality of RUs to transmit uplink data. This improves spectral efficiency and network throughput, and improves network performance.

Figure 14:
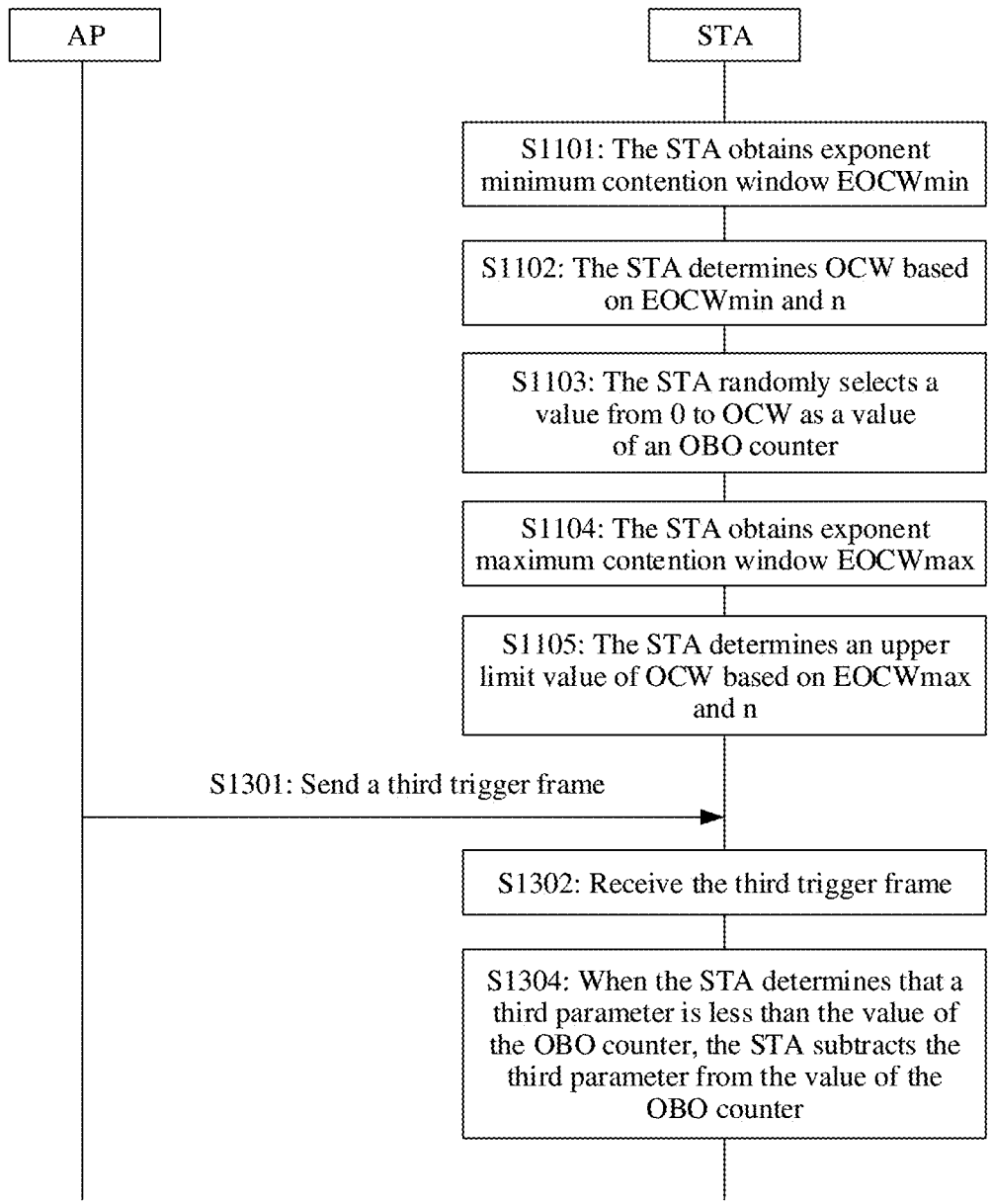
FIG. 14 is a schematic flowchart of another method for uplink orthogonal frequency division multiple access random access according to an embodiment of this application.

For example, this embodiment of this application further provides a method for uplink orthogonal frequency division multiple access random access. As shown in FIG. 14, when the STA determines that the third parameter is less than the OBO counter, the method may further include S1304 after steps S1301 and S1302.

S1304: When the STA determines that the third parameter is less than the value of the OBO counter, the STA subtracts the third parameter from the value of the OBO counter.

The third parameter is associated with k2. For example, the third parameter may be calculated based on k2, or a value of the third parameter may be calculated based on k2 and another parameter, or the like.

The third parameter in step S1304 may have different values. A backoff speeds of the OBO counter varies with different values of the third parameter. The following uses two implementations as an example to describe a specific implementation of step S1304 when the third parameter has different values. It may be understood that the value of the third parameter in step S1304 is corresponding to the value of the first parameter in step S1303.

In a first implementation, the third parameter is k2.

For example, the number n of RUs supported by the STA is 3, the number k2 of RA-RUs allocated by the AP in the third trigger frame is 3, and the value of the OBO counter is 8. The STA determines that the third parameter k2 is less than the value 8 of the OBO counter, and the STA subtracts 3 from the value 8 of the OBO counter, to be specific, the value of the OBO counter is 5.

In this implementation, compared with setting OCWmin to OCW in the conventional technology, in this embodiment, the value of OCW is increased by using steps S1101 to S1103. Therefore, the value of the OBO counter randomly selected from 0 to OCW is also increased. Therefore, even though k2 is compared with the value of the OBO counter during backoff in this implementation, because the value of the OBO counter is increased, the overall backoff speed of the OBO counter becomes slower. This ensures random access fairness between the STA supporting a plurality of RUs and the STA supporting only a single RU.

In a second implementation, the third parameter may be obtained through calculation based on k2, n, and m2. For example, the third parameter is $\lfloor k2*n/(n-m2) \rfloor$, and $\lfloor X \rfloor$ indicates rounding down the real number X.

For example, the number n of RUs supported by the STA is 3, the number k2 of RA-RUs allocated by the AP in the third trigger frame is 3, the number m2 of RUs of the STA scheduled by the AP is 1, and the value of the OBO counter is 8. The STA determines that the third parameter $\lfloor k2*n/(n-m2) \rfloor$ is less than the value 8 of the OBO counter, and the STA subtracts 4 from the value 8 of the OBO counter, to be specific, the value of the OBO counter is 4.

In this implementation, compared with setting OCWmin to OCW in the conventional technology, in this embodiment, the value of OCW is increased by using steps S1101 to S1103. Therefore, the value of the OBO counter randomly selected from 0 to OCW is also increased. Compared with the previous implementation, because the actual capability of the STA is (n−m2) less than n, the backoff speed of the OBO counter may be correspondingly increased, so that the backoff speed of the OBO counter is increased by n/(n−m2).

This embodiment provides a method for uplink orthogonal frequency division multiple access random access. Exponent minimum contention window EOCWmin is obtained by using the STA. The STA determines OCW based on EOCWmin and n. The STA randomly selects a value from 0 to OCW as the value of the OBO counter. The AP sends the third trigger frame to the STA. The third trigger frame includes the information used to determine the number k2 of RA-RUs allocated by the AP. k2>0, and k2 is an integer. The STA receives the third trigger frame. When the STA determines that the third parameter is less than the value of the OBO counter, the STA subtracts k2 from the value of the OBO counter. In this embodiment, the value of OCW is increased, and the value of the OBO counter is also correspondingly increased. This ensures random access fairness between the STA supporting a plurality of RUs and the STA supporting only a single RU while keeping the backoff speed of the OBO counter unchanged. In this embodiment, the STA supports a plurality of RUs to transmit uplink data. This improves spectral efficiency and network throughput, and improves network performance.

It should be noted that after the foregoing steps S1301 to S1304, when the AP sends a trigger frame to the STA again, the AP may continue to repeatedly perform steps S1301 to S1304, or may similarly repeatedly perform steps S701 to S704. Different from steps S701 to S704, in this solution, (n−k2) or a remainder of (k2*n) divided by (n−m2) may be counted into a total number of RA-RUs in a next trigger frame, and then the total number continues to be compared with the OBO counter.

Figure 15:
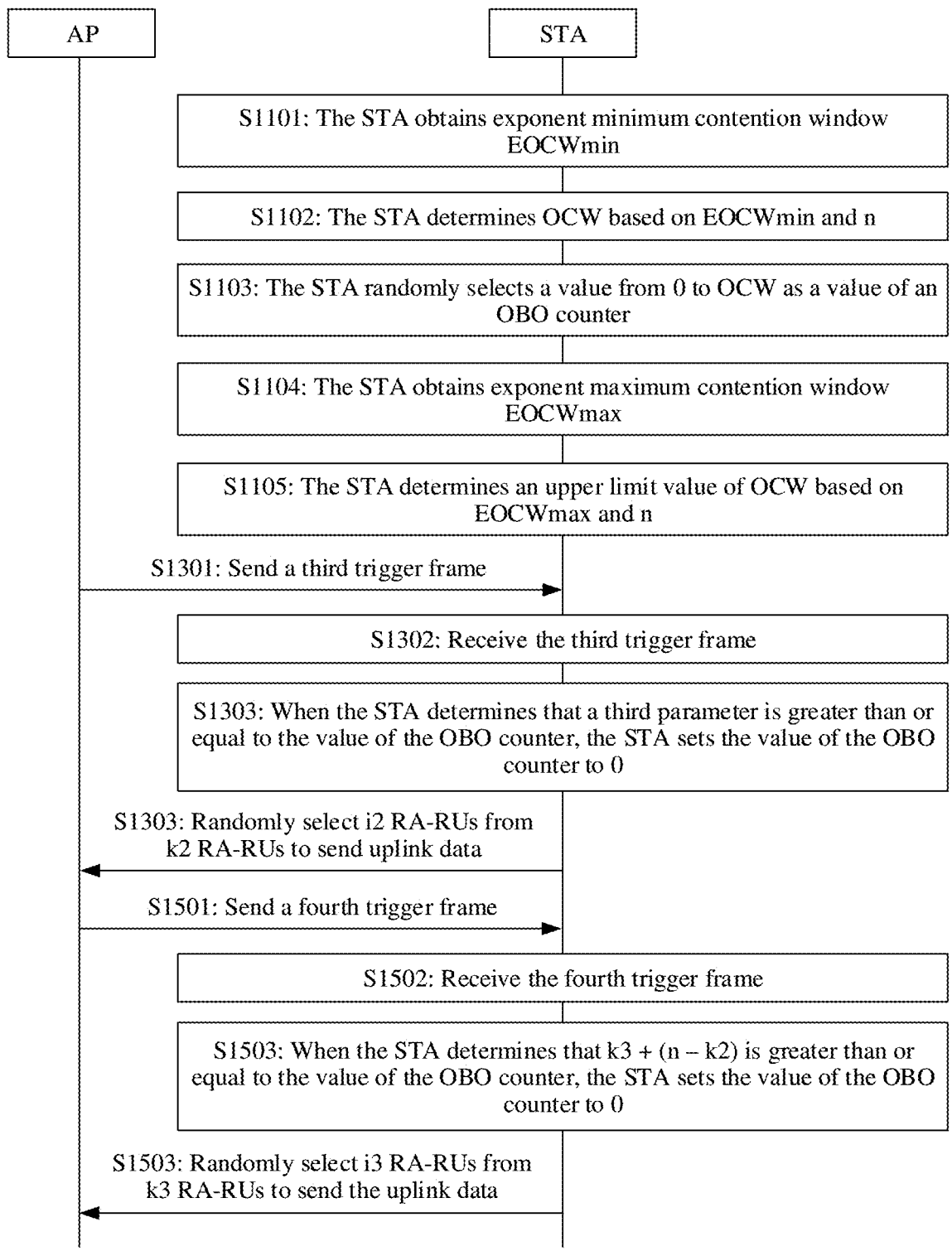
FIG. 15 is a schematic flowchart of another method for uplink orthogonal frequency division multiple access random access according to an embodiment of this application.

An embodiment of this application further provides a method for uplink orthogonal frequency division multiple access random access. As shown in FIG. 15, when the third parameter is k2, and k2 is less than (n−m2), the method may further include S1501 to S1503 after steps S1301 to S1303.

S1501: The AP sends a fourth trigger frame to the STA, where the fourth trigger frame includes information used to determine a number k3 of RA-RUs allocated by the AP, k3 >0, and k3 is an integer.

For example, a frame structure of the fourth trigger frame is shown in FIG. 2(*a*) to FIG. 2(*c*). The foregoing information used to determine the number k3 of RA-RUs allocated by the AP may be carried in an RA-RU information (RA-RU Information) field in FIG. 2(*b*), and specifically, may be carried in a number of RA-RU field in FIG. 2(*c*). The number k3 of RA-RUs allocated by the AP is a sum of numbers of RA-RUs indicated by number of RA-RU fields in all user info fields whose AID 12 is 0 or 2045 in the fourth trigger frame.

Optionally, the fourth trigger frame further includes information used to determine a number m3 of RUs of the STA scheduled by the AP. m3>0, and m3 is an integer. For example, the number m3 of RUs of the STA scheduled by the AP is a number of all user info fields whose AID 12 fields are set to an AID of the STA in the fourth trigger frame.

S1502: The STA receives the fourth trigger frame.

For example, the STA receives the fourth trigger frame sent by the AP. The STA may determine, based on the fourth trigger frame, the number k3 of RA-RUs allocated by the AP.

Optionally, when the fourth trigger frame further includes the information used to determine the number m3 of RUs of the STA scheduled by the AP, the STA may determine, based on the fourth trigger frame, the number m3 of RUs of the STA scheduled by the AP.

S1503: When the STA determines that k3+(n−k2) is greater than or equal to the value of the OBO counter, the STA sets the value of the OBO counter to 0, and the STA randomly selects i3 RA-RUs from the k3 RA-RUs to send the uplink data, where i3≤n.

For example, in this implementation, a difference obtained by subtracting k2 in the third trigger frame from n is added to a total number of RA-RUs in the fourth trigger frame. To be specific, the number of RA-RUs in the fourth trigger frame is compensated. Specifically, a difference obtained by subtracting k2 from n is added to the number k3 of RA-RUs allocated by the AP in the fourth trigger frame, and then the number is compared with the value of the OBO counter.

It may be understood that a purpose of compensating for the number of RA-RUs in the fourth trigger frame is to avoid that a backoff speed of the STA is excessively slow when the number of RA-RUs allocated by the AP is less than the actual capability of the STA.

This embodiment provides a method for uplink orthogonal frequency division multiple access random access. Exponent minimum contention window EOCWmin is obtained by using the STA. The STA determines OCW based on EOCWmin and n. The STA randomly selects a value from 0 to OCW as the value of the OBO counter. The AP sends the third trigger frame to the STA. The third trigger frame includes the information used to determine the number k2 of RA-RUs allocated by the AP. k2>0, and k2 is an integer. The STA receives the third trigger frame. When the STA determines that the third parameter is greater than or equal to the value of the OBO counter, the STA sets the value of the OBO counter to 0. The STA randomly selects the i2 RA-RUs from the k2 RA-RUs to send the uplink data. i2≤n. The AP sends the fourth trigger frame to the STA. The fourth trigger frame includes the information used to determine the number k3 of RA-RUs allocated by the AP. k3>0, and k3 is an integer. The STA receives the fourth trigger frame. When the STA determines that k3+(n−k2) is greater than or equal to the value of the OBO counter, the STA sets the value of the OBO counter to 0. The STA randomly selects the i3 RA-RUs from the k3 RA-RUs to send the uplink data. i3 n. In this embodiment, the value of OCW is increased, and the value of the OBO counter is also correspondingly increased. The number of RA-RUs in the fourth trigger frame is compensated, to avoid that the backoff speed of the STA is excessively slow when the number of RA-RUs allocated by the AP is less than the actual capability of the STA. This ensures random access fairness between the STA supporting a plurality of RUs and the STA supporting only a single RU. In this embodiment, the STA supports a plurality of RUs to transmit the uplink data. This improves spectral efficiency and network throughput, and improves network performance.

Figure 16:
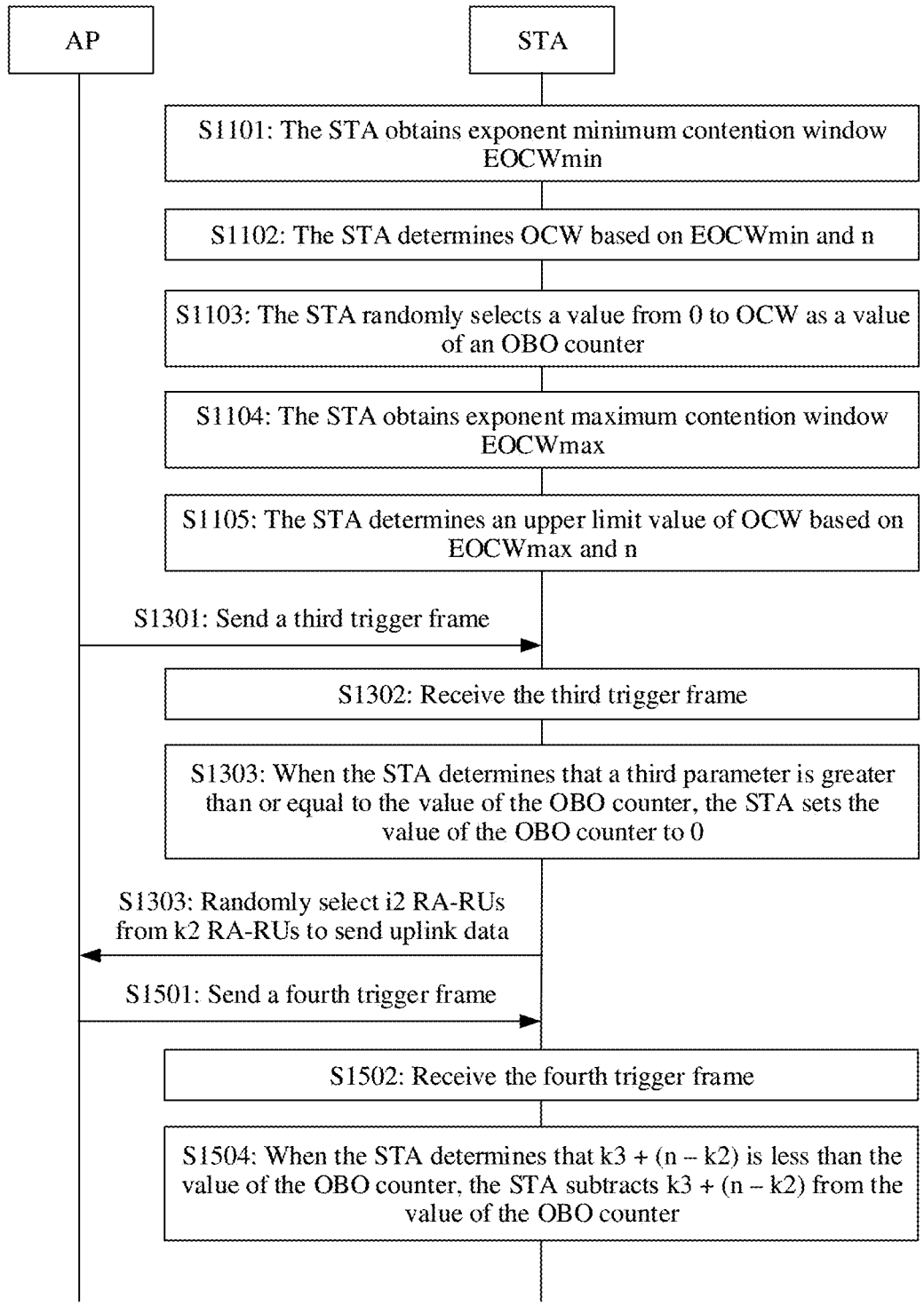
FIG. 16 is a schematic flowchart of another method for uplink orthogonal frequency division multiple access random access according to an embodiment of this application.

For example, this embodiment of this application further provides a method for uplink orthogonal frequency division multiple access random access. As shown in FIG. 16, when the STA determines that k3+(n−k2) is less than the OBO counter, the method may further include S1504 after steps S1501 and S1502.

S1504. When the STA determines that k3+(n−k2) is less than the value of the OBO counter, the STA subtracts k3+(n−k2) from the value of the OBO counter.

It may be understood that, in this embodiment, the number of RA-RUs in the fourth trigger frame is compensated, so that the backoff speed of the OBO counter is accelerated. This ensures random access fairness between the STA supporting a plurality of RUs and the STA supporting only a single RU when the number of RA-RUs allocated by the AP is less than the actual capability of the STA.

Figure 17:
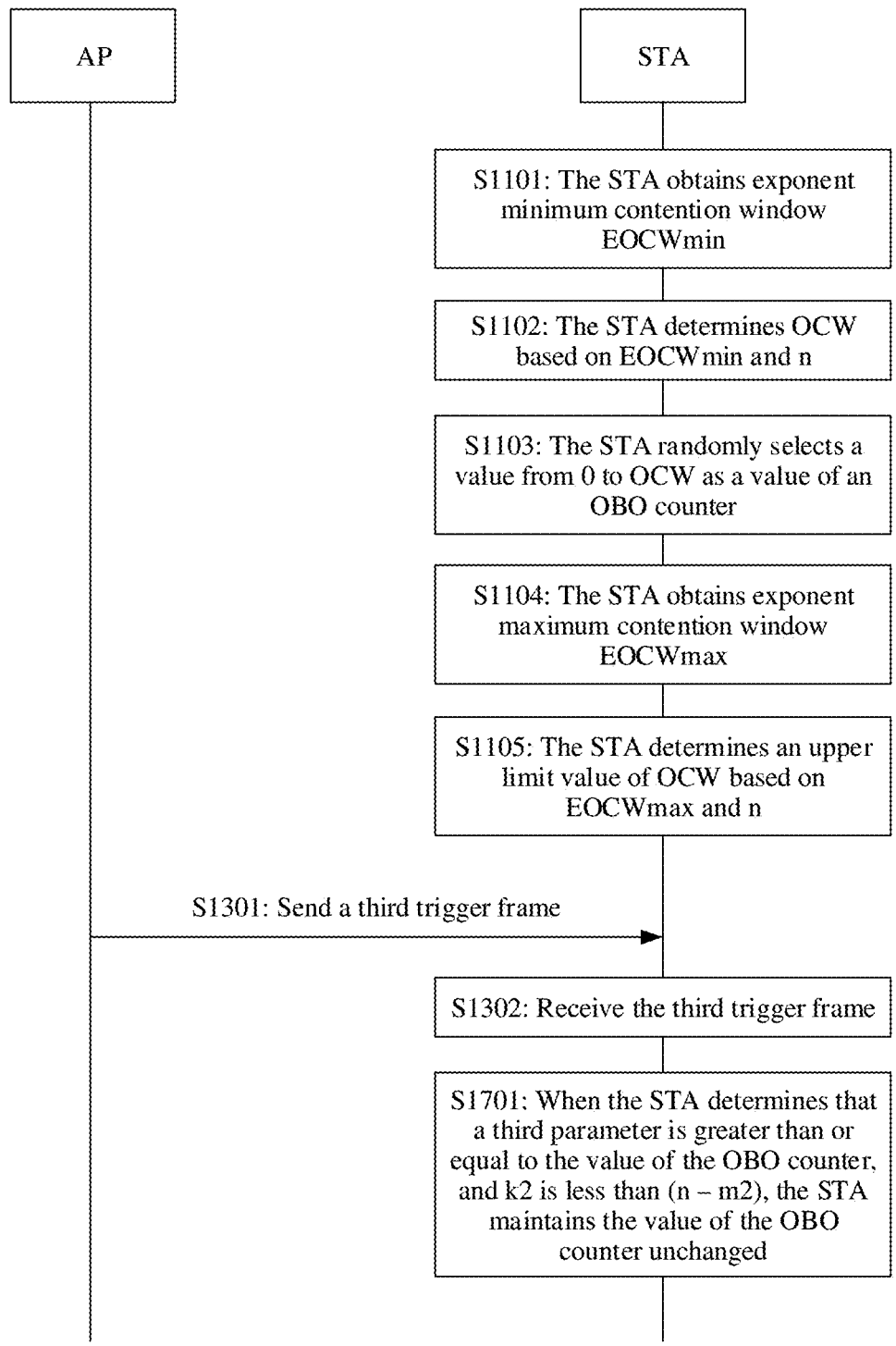
FIG. 17 is a schematic flowchart of another method for uplink orthogonal frequency division multiple access random access according to an embodiment of this application.

For example, an embodiment of this application further provides a method for uplink orthogonal frequency division multiple access random access. After steps S1301 and S1302, when the STA determines that the third parameter is greater than or equal to the value of the OBO counter and k2 is less than (n−m2), as shown in FIG. 17, the method further includes step S1701.

S1701: When the STA determines that the third parameter is greater than or equal to the value of the OBO counter, and k2 is less than (n−m2), the STA keeps the value of the OBO counter unchanged.

It may be understood that, for a specific implementation in which the third parameter and the STA determines that the third parameter is greater than or equal to the value of the OBO counter, refer to related descriptions in step S1303, and details are not described herein again.

For example, when the STA determines that the third parameter is greater than or equal to the value of the OBO counter, if a backoff procedure is performed, the STA sets the value of the OBO counter to 0. However, because m2 is greater than 0, to be specific, the actual capability of the STA to perform UORA is (n−m2), the STA contends for a maximum of (n−m2) RA-RUs to transmit the uplink data. However, the number k2 of RA-RUs allocated by the AP is less than (n−m2). Therefore, the STA contends for a maximum of the k2 RA-RUs to transmit the uplink data. It may be understood that in this case, to avoid that when performing backoff at a slow backoff speed, the STA supports a plurality of RUs can only select a small number of RA-RUs to perform UORA, the STA may choose not to perform the backoff procedure in this case. To be specific, the STA keeps the value of the OBO counter unchanged. Optionally, the STA may perform the backoff procedure when the third trigger frame does not include the RA-RU scheduled by the AP, or a number of RA-RUs scheduled by the AP is small.

This embodiment provides a method for uplink orthogonal frequency division multiple access random access. Exponent minimum contention window EOCWmin is obtained by using the STA. The STA determines OCW based on EOCWmin and n. The STA randomly selects a value from 0 to OCW as the value of the OBO counter. The AP sends the third trigger frame to the STA. The third trigger frame includes the information used to determine the number k2 of RA-RUs allocated by the AP. k2>0, and k2 is an integer. The STA receives the third trigger frame. When the STA determines that the third parameter is greater than or equal to the value of the OBO counter and k2 is less than (n−m2), the STA keeps the value of the OBO counter unchanged. In this embodiment, when the STA supports a plurality of RUs and the STA determines that the third parameter is greater than or equal to the value of the OBO counter and k2 is less than (n−m2), the STA does not perform the backoff procedure, and keeps the value of the OBO counter unchanged. Compared with the conventional technology, in this embodiment, the STA supports a plurality of RUs to transmit the uplink data. This improves spectral efficiency and network throughput, and improves network performance. In addition, the value of OCW is increased, and the value of the OBO counter is also correspondingly increased. This ensures random access fairness between the STA supporting a plurality of RUs and the STA supporting only a single RU.

Figure 18:
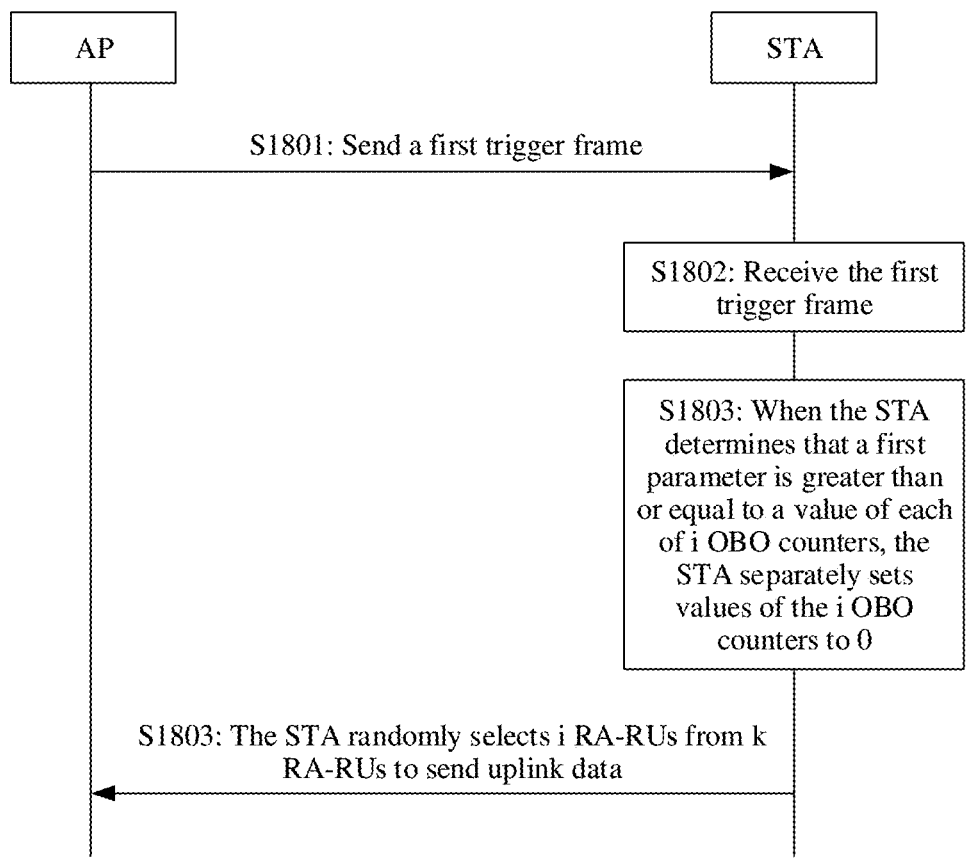
FIG. 18 is a schematic flowchart of another method for uplink orthogonal frequency division multiple access random access according to an embodiment of this application.

This application further provides another method for uplink orthogonal frequency division multiple access random access, applied to a scenario in which a STA supports n resource units RUs. n>1, and n is an integer. The STA maintains n OBO counters. As shown in FIG. 18, the method includes steps S1801 to S1803.

S1801: An AP sends a first trigger frame to the STA, where the first trigger frame includes information used to determine a number k of RA-RUs allocated by the AP, k>0, and k is an integer.

S1802: The STA receives the first trigger frame.

It may be understood that for specific implementations of steps S1801 and S1802, refer to steps S501 and S502. Details are not described herein again.

S1803: When the STA determines that a first parameter is greater than or equal to a value of each of i OBO counters, the STA separately sets values of the i OBO counters to 0. The STA randomly selects i RA-RUs from the k RA-RUs to send uplink data. i is greater than or equal to 1 and less than or equal to n, and i is an integer.

For example, the i RA-RUs are different from each other. To be specific, when backoff of the value of each of the i OBO counters is 0, the STA may randomly select a maximum of i RA-RUs that are different from each other from the k RA-RUs to send the uplink data.

Optionally, values of the n OBO counters are different from each other. An advantage of this method is that i>k does not occur, and i different RA-RUs cannot be selected from the k RA-RUs.

Optionally, when the first trigger frame further includes information used to determine a number m of RUs of the STA scheduled by the AP, m>0, and m is an integer, the STA maintains (n−m) OBO counters. To be specific, after the first trigger frame is received, only the (n−m) OBO counters perform backoff, and other m OBO counters that are not maintained are temporarily suspended, and their values keep unchanged.

In a first implementation, that the STA maintains (n−m) OBO counters may include: The STA sorts the n OBO counters, and maintains first (n−m) OBO counters in the n OBO counters, the STA maintains last (n−m) OBO counters in the n OBO counters, the STA maintains middle (n−m) OBO counters in the n OBO counters, or the STA maintains (n−m) OBO counters starting from a $j^{th}$ counter.

In a second implementation, that the STA maintains (n−m) OBO counters may include: The STA randomly selects (n−m) OBO counters from the n OBO counters for maintenance.

A specific implementation in which the STA maintains the (n−m) OBO counters is not limited in this embodiment of this application, and is merely an example for description herein.

Optionally, when k is less than or equal to i, that the STA randomly selects i RA-RUs from the k RA-RUs to send the uplink data includes: The STA sends the uplink data by using the k RA-RUs.

It may be understood that, for a specific value of the first parameter and a specific implementation in which the STA determines that the first parameter is greater than or equal to the value of the OBO counter, refer to related descriptions in step S503, and details are not described herein again.

It should be noted that, different from the foregoing embodiments, the STA in the foregoing embodiment maintains only one OBO counter, and in this embodiment, the STA maintains a plurality of OBO counters, to be specific, the STA maintains a plurality of backoff procedures. Therefore, a STA supporting a plurality of RUs obtains more access opportunities than a STA supporting a single RU.

This embodiment provides a method for uplink orthogonal frequency division multiple access random access. The AP sends the first trigger frame to the STA. The first trigger frame includes the information used to determine the number k of RA-RUs allocated by the AP. k>0, and k is an integer. The STA receives the first trigger frame. When the STA determines that the first parameter is greater than or equal to the value of each of the i OBO counters, the STA sets the values of the i OBO counters to 0. The STA randomly selects the i RA-RUs from the k RA-RUs to send the uplink data. i is greater than or equal to 1 and less than or equal to n, and i is an integer. In this embodiment, the STA maintains a plurality of OBO counters, to be specific, the STA maintains a plurality of backoff procedures, so that the STA supporting a plurality of RUs obtains more access opportunities than the STA supporting a single RU. Compared with the conventional technology, in this embodiment, the STA supports a plurality of RUs to transmit the uplink data. This improves spectral efficiency and network throughput, and improves network performance.

Figure 19:
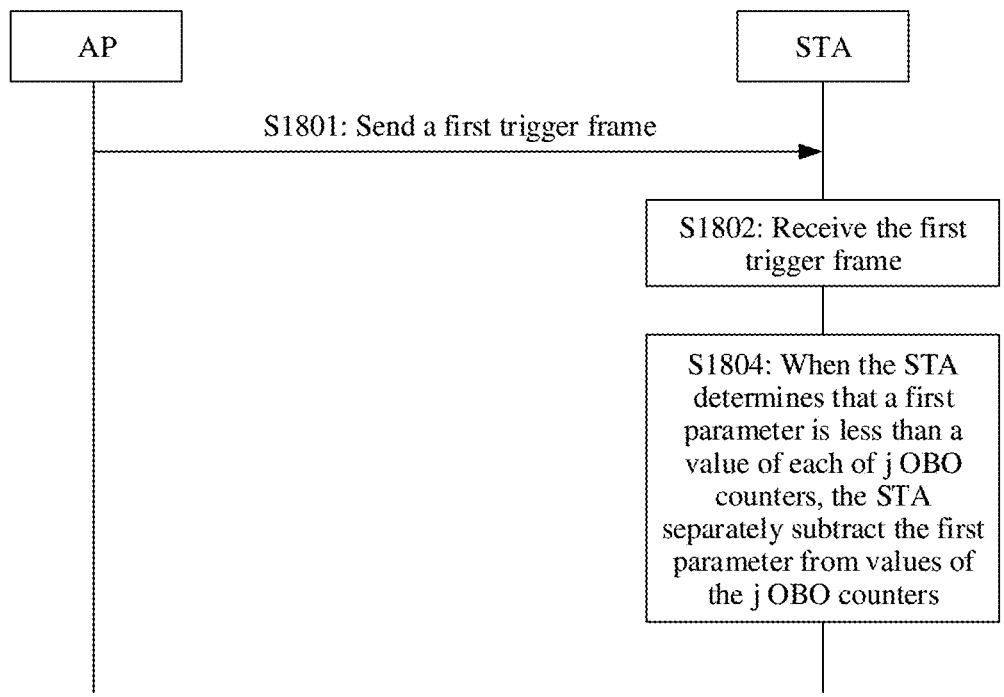
FIG. 19 is a schematic flowchart of another method for uplink orthogonal frequency division multiple access random access according to an embodiment of this application.

For example, this embodiment of this application further provides a method for uplink orthogonal frequency division multiple access random access. As shown in FIG. 19, when the STA determines that the first parameter is less than j OBO counter, the method may further include S1804 after steps S1801 and S1802.

S1804: When the STA determines that the first parameter is less than a value of each of the j OBO counters, the STA separately subtracts the first parameter from values of the j OBO counters, where j is greater than or equal to 0 and less than or equal to n, and j is an integer.

It may be understood that, for a specific value of the first parameter and a specific implementation in which the STA determines that the first parameter is less than the value of the OBO counter, refer to related descriptions in step S504, and details are not described herein again.

This embodiment provides a method for uplink orthogonal frequency division multiple access random access. The AP sends the first trigger frame to the STA. The first trigger frame includes the information used to determine the number k of RA-RUs allocated by the AP. k>0, and k is an integer. The STA receives the first trigger frame. When the STA determines that the first parameter is less than the value of each of the j OBO counters, the STA subtracts the first parameter from the value of the j OBO counters. j is greater than or equal to 0 and less than or equal to n, and j is an integer. In this embodiment, the STA maintains a plurality of OBO counters, to be specific, the STA maintains a plurality of backoff procedures, so that the STA supporting a plurality of RUs obtains more access opportunities than the STA supporting a single RU. Compared with the conventional technology, in this embodiment, the STA supports a plurality of RUs to transmit the uplink data. This improves spectral efficiency and network throughput, and improves network performance.

The foregoing mainly describes the solutions provided in the embodiments of this application from a perspective of method steps. It may be understood that, to implement the foregoing functions, a computer includes corresponding hardware structures and/or software modules for performing the functions. A person skilled in the art should be easily aware that, in combination with modules and algorithm steps of the examples described in the embodiments disclosed in this specification, this application can be implemented by a combination of hardware and computer software. A person skilled in the art may use different methods to implement the described functions for each particular application, but it should not be considered that the implementation goes beyond the scope of this application.

In the embodiments of this application, the STA may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software function module. It should be noted that, in the embodiments of this application, division into the modules is an example, and is merely logical function division. In an actual implementation, another division manner may be used.

Figure 20:
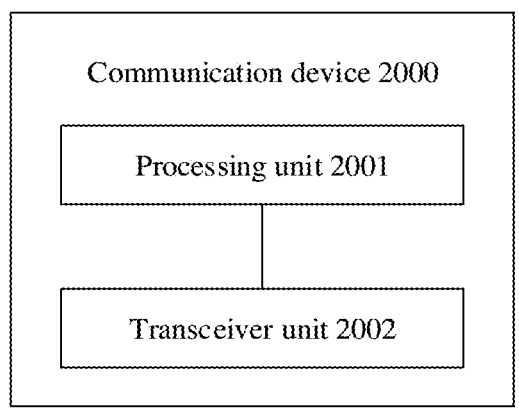
FIG. 20 is a schematic diagram of composition of a communication device according to an embodiment of this application.

When each function module is obtained through division corresponding to each function, FIG. 20 shows a schematic diagram of a structure of a communication device 2000. The communication device may be the foregoing STA, or may be a chip in the foregoing STA. The communication device 2000 may be configured to implement a method and a function of the STA in any one of the foregoing embodiments.

The communication device 2000 includes a processing unit 2001 and a transceiver unit 2002. For example, the transceiver unit 2002 may be configured to support a station in communicating with the AP in the foregoing embodiments. The processing unit 2001 is configured to control and manage an action of the STA, and is configured to perform processing performed by the STA in the foregoing embodiments. Optionally, if the communication device 2000 includes a storage unit, the processing unit 2001 may further execute a program or instructions stored in the memory, so that the communication device 2000 is enabled to implement the method and the function in any one of the foregoing embodiments.

For example, the processing unit 2001 may be configured to perform, for example, step S503 in FIG. 5, or step S504 in FIG. 6, or steps S504 and S703 in FIG. 7, or S504 and S704 in FIG. 8, or step S901 in FIG. 9, or step S1001 in FIG. 10, or steps S1102 and S1103 in FIG. 11, or steps S1102, S1103, and S1105 in FIG. 12, or steps S1102, S1103, S1105, and S1303 in FIG. 13, or steps S1102, S1103, S1105, and S1304 in FIG. 14, or steps S1102, S1103, S1105, S1303, and S1503 in FIG. 15, or steps S1102, S1103, S1105, S1303, and S1504 in FIG. 16, or steps S1102, S1103, S1105, and S1701 in FIG. 17, or step S1803 in FIG. 18, or step S1804 in FIG. 19, and/or is configured to perform another process of the technology described in this specification. The transceiver unit 2002 may be configured to receive a trigger frame sent by the AP, including the first trigger frame, the second trigger frame, the third trigger frame, and the fourth trigger frame in the foregoing embodiment. The transceiver unit 2002 is further configured to obtain exponent minimum contention window EOCWmin and exponent maximum contention window EOCWmax. The transceiver unit 2002 is further configured to send uplink data on an RA-RU selected by the processing unit 2001, and/or is configured to perform another process of the technology described in this specification. All related content of the steps in the foregoing method embodiments may be cited in function descriptions of corresponding function modules. Details are not described herein again.

For example, the communication device 2000 may be the communication apparatus shown in FIG. 4, the processing unit 2001 may be the processor 401 in FIG. 4, and the transceiver unit 2002 may be the transceiver 403 in FIG. 4. Optionally, the communication device 2000 may further include a memory. The memory is configured to store program code and data that are corresponding to the communication device 2000 performing any method for uplink orthogonal frequency division multiple access random access provided above. Descriptions of all related content of the components in FIG. 4 may be cited in function descriptions of corresponding components of the communication device 2000, and details are not described herein again.

For example, the communication device 2000 may be a chip or a chip system in a station, the processing unit 2001 may be a processing circuit in the chip or the chip system, and the transceiver unit 2002 may be an input/output interface in the chip or the chip system. The processing circuit may be configured to implement signaling or data processing in the foregoing embodiments, and the input/output interface may be configured to implement signaling or data exchange in the foregoing embodiments. For example, "sending" in the foregoing embodiment may alternatively be "output", and "receiving" may alternatively be "input". Optionally, the chip or the chip system may be further coupled to a storage medium. The storage medium may be encapsulated inside the chip system, or may be an external memory located outside the chip system. The storage medium stores instructions. When the instructions are run by the chip system or system, the apparatus or device on which the chip or the chip system is installed may implement the method and the function in any one of the foregoing embodiments.

An embodiment of this application further provides a communication apparatus. The communication apparatus includes a processor, and may further include a transceiver and a memory. The transceiver is configured to send and receive information, or configured to communicate with another network element. The memory is configured to store computer-executable instructions. The processor is configured to execute the computer-executable instructions, to support a station to implement the method for uplink orthogonal frequency division multiple access random access in any one embodiment in FIG. 5 to FIG. 19.

An embodiment of this application further provides a computer-readable storage medium. The computer-readable storage medium stores computer program code. When the processor executes the computer program code, an electronic device performs the method for uplink orthogonal frequency division multiple access random access in any one embodiment in FIG. 5 to FIG. 19.

An embodiment of this application further provides a computer program product. When the computer program product runs on a computer, the computer is enabled to perform the method for uplink orthogonal frequency division multiple access random access in any one embodiment in FIG. 5 to FIG. 19.

An embodiment of this application further provides a communication apparatus. The apparatus may exist in a product form of a chip. A structure of the apparatus includes a processor and an interface circuit. The processor is configured to communicate with another apparatus by using a receiving circuit, so that the apparatus is enabled to perform the method for uplink orthogonal frequency division multiple access random access in any one of the foregoing embodiments in FIG. 5 to FIG. 19.

An embodiment of this application further provides a communication system, including an access point and a station. The access point and the station may perform the method for uplink orthogonal frequency division multiple access random access in any one of the embodiments in FIG. 5 to FIG. 19.

Method or algorithm steps described in combination with the content disclosed in this application may be implemented by hardware, or may be implemented by a processor by executing a software instruction. The software instructions may include a corresponding software module. The software module may be stored in a random access memory (Random Access Memory, RAM), a flash memory, an erasable programmable read-only memory (Erasable Programmable ROM, EPROM), an electrically erasable programmable read-only memory (Electrically EPROM, EEPROM), a register, a hard disk, a removable hard disk, a compact disc read-only memory (CD-ROM), or any other form of storage medium well-known in the art. For example, a storage medium is coupled to the processor, so that the processor can read information from the storage medium or write information into the storage medium. Certainly, the storage medium may further be a component of the processor. The processor and the storage medium may be located in an ASIC. In addition, the ASIC may be located in a core network interface device. Certainly, the processor and the storage medium may exist in the core network interface device as discrete components.

A person of skill in the art should be aware that in one or more of the foregoing examples, the functions described in this application may be implemented by using hardware, software, firmware, or any combination thereof. When the functions are implemented by software, the foregoing functions may be stored in a computer-readable medium or transmitted as one or more instructions or code in a computer-readable medium. The computer-readable medium includes a computer storage medium and a communication medium, where the communication medium includes any medium that facilitates transmission of a computer program from one place to another. The storage medium may be any available medium accessible to a general purpose or dedicated computer.

The objectives, technical solutions, and benefits of this application are further described in detail in the foregoing specific embodiments. It should be understood that the foregoing descriptions are merely specific embodiments of this application, but are not intended to limit the protection scope of this application. Any modification, equivalent replacement or improvement made based on technical solutions of this application shall fall within the protection scope of this application.

What is claimed is:

1. A method, comprising:
 receiving, by a station (STA), a first trigger frame sent by an access point (AP), wherein the STA supports n resource units RUs, wherein n>1, wherein n is an integer, wherein the first trigger frame comprises information used to determine a number k of random access resource units (RA-RUs) allocated by the AP, wherein k>o, and wherein k is an integer; and
 setting, by the STA, in response to the STA determining that a first parameter is greater than or equal to a value of an orthogonal frequency division multiple access (OFDMA) random access backoff (OBO) counter, the value of the OBO counter to o, and randomly selecting, by the STA, i RA-RUs from the k RA-RUs to send uplink data, wherein i≤n, and wherein the first parameter is computed from k and n.

2. The method according to claim 1, further comprising:
 subtracting, by the STA, in response to the STA determining that the first parameter is less than the OBO counter, the first parameter from the value of the OBO counter.

3. The method according to claim 2, wherein the first parameter is $\lfloor k/n \rfloor$, and wherein $\lfloor X \rfloor$ indicates rounding down the real number X.

4. The method according to claim 3, further comprising:
 receiving, by the STA, a second trigger frame, wherein the second trigger frame comprises information used to determine a number k1 of RA-RUs allocated by the AP, wherein k1>o, and wherein k1 is an integer;
 setting, by the STA, in response to the STA determining that $\lfloor [k1+(k \bmod n)]/(n) \rfloor$ is greater than or equal to the value of the OBO counter, the value of the OBO counter to o, and randomly selecting, by the STA, i1 RA-RUs from the k1 RA-RUs to send the uplink data, wherein i1≤n, and wherein (k mod n) indicates a remainder of k divided by n; and
 subtracting, by the STA, in response to the STA determining that $\lfloor [k1+(k \bmod n)]/(n) \rfloor$ is less than the value of the OBO counter, $\lfloor [k1+(k \bmod n)]/(n) \rfloor$ from the value of the OBO counter.

5. The method according to claim 2, wherein the first trigger frame further comprises information used to determine a number m of resource units RUs of the STA scheduled by the AP, wherein m>o, wherein m is an integer, wherein the first parameter is $\lfloor k/(n-m) \rfloor$, and wherein $\lfloor X \rfloor$ indicates rounding down the real number X.

6. The method according to claim 5, further comprising:
 receiving, by the STA, a second trigger frame, wherein the second trigger frame comprises information used to determine a number k1 of RA-RUs allocated by the AP and a number m1 of RUs of the STA scheduled by the AP, wherein k1>o, wherein k1 is an integer, m1>o, and wherein m1 is an integer;
 setting, by the STA, in response to the STA determining that $\lfloor \{k1+[k \bmod (n-m)]\}/(n-m1) \rfloor$ is greater than or equal to the value of the OBO counter, the value of the OBO counter to o, and randomly selecting, by the STA, i1 RA-RUs from the k1 RA-RUs to send the uplink data, wherein i1≤(n-m), and wherein [k mod (n-m)] indicates a remainder of k divided by (n-m); and
 subtracting, by the STA, in response to the STA determining that $\lfloor \{k1+[k \bmod (n-m)]\}/(n-m1) \rfloor$ is less than the value of the OBO counter, $\lfloor \{k1+[k \bmod (n-m)]\}/(n-m1) \rfloor$ from the value of the OBO counter.

7. The method according to claim 1, wherein the first trigger frame further comprises information used to determine a number m of resource units RUs of the STA scheduled by the AP, wherein m>o, wherein m is an integer; and
 wherein the method further comprises:
 keeping, by the STA, the value of the OBO counter unchanged in response to the STA determining that m is greater than o.

8. The method according to claim 1, wherein the first trigger frame further comprises a number m of RUs of the STA scheduled by the AP, wherein m>o, wherein m is an integer; and wherein the method further comprises:
keeping, by the STA, the value of the OBO counter unchanged in response to the STA determining that the first parameter is greater than or equal to the value of the OBO counter and further in response to m being greater than o.

9. The method according to claim 1, further comprising:
obtaining, by the STA, exponent minimum contention window (EOCWmin);
determining, by the STA, OFDMA contention window (OCW) based on EOCWmin and n; and
randomly selecting, by the STA, a value from o to OCW as the value of the OBO counter.

10. The method according to claim 9, wherein the determining, by the STA, OCW based on EOCWmin and n comprises determining OCW according to at least one of:
$OCW = n*(2^{EOCWmin}-1)$; or
$OCW = 2^{EOCWmin+n-1}-1$.

11. The method according to claim 9, further comprising:
obtaining, by the STA, exponent maximum contention window (EOCWmax); and
determining, by the STA, an upper limit value of OCW based on EOCWmax and n.

12. The method according to claim 11, wherein determining, by the STA, the upper limit value of OCW based on EOCWmax and n comprises:
setting, by the STA, OCWmax to $n*(2^{EOCWmax}-1)$ or $2^{EOCWmax+n-1}-1$; or
setting, by the STA, the upper limit value of OCW to $n*(2^{EOCWmax}-1)$ or $2^{EOCWmax+n-1}-1$.

13. The method according to claim 1, further comprising performing at least one of:
determining, by the STA, that transmission fails in response to no acknowledgment message sent by the AP being received in response to the uplink data transmitted by all RA-RUS, wherein the acknowledgment message indicates that the AP successfully receives data transmitted by the RA-RU; or
determining, by the STA, that transmission fails in response to the acknowledgment message sent by the AP not being received in response to the uplink data transmitted by one or more RA-RUs.

14. A method for uplink orthogonal frequency division multiple access random access, comprising:
receiving, by a station (STA), a trigger frame sent by an access point (AP), wherein the STA supports n resource units (Rus), wherein n>1 and n is an integer, wherein the STA maintains n orthogonal frequency division multiple access (OFDMA) random access backoff (OBO) counters, wherein the trigger frame comprises information used to determine a number k of random access resource units RA-RUs allocated by the AP, wherein k>o, and wherein k is an integer; and
separately setting, by the STA, values of the i OBO counters to o in response to the STA determining that a first parameter is greater than or equal to a value of each of i OBO counters, and randomly selecting, by the STA, i RA-RUs from the k RA-RUs to send uplink data, wherein the i RA-RUs are different from each other, wherein i is greater than or equal to 1 and less than or equal to n, wherein i is an integer, and wherein the first parameter is computed from k and n.

15. The method according to claim 14, further comprising:
separately subtracting, by the STA, the first parameter from values of j OBO counters in response to the STA determining that the first parameter is less than a value of each of the j OBO counters, wherein j is greater than or equal to o and less than or equal to n, and wherein j is an integer.

16. The method according to claim 15, wherein:
the first parameter is $\lfloor k/n \rfloor$, and wherein $\lfloor X \rfloor$ indicates rounding down the real number X; or
the trigger frame further comprises information used to determine a number m of RUs of the STA scheduled by the AP, wherein m>o, m is an integer, the first parameter is $\lfloor k/(n-m) \rfloor$, and $\lfloor X \rfloor$ indicates rounding down the real number X.

17. The method according to claim 14, wherein values of the n OBO counters are different from each other.

18. The method according to claim 14, wherein randomly selecting, by the STA, i RA-RUs from the k RA-RUs to send the uplink data comprises performing, in response to k being less than or equal to i:
selecting, by the STA, the k RA-RUs to send the uplink data.

19. A communication apparatus, comprising:
a transceiver;
a processor; and
a non-transitory computer readable medium storing computer program instructions for execution, by the processor, with the communications apparatus acting as a station (STA), of a method for uplink orthogonal frequency division multiple access random access, the computer program instructions including instructions for:
receiving, by the station (STA), a first trigger frame sent by an access point (AP), wherein the STA supports n resource units RUs, wherein n>1, wherein n is an integer, wherein the first trigger frame comprises information used to determine a number k of random access resource units (RA-RUs) allocated by the AP, wherein k>o, and wherein k is an integer; and
setting, by the STA, in response to the STA determining that a first parameter is greater than or equal to a value of an orthogonal frequency division multiple access (OFDMA) random access backoff (OBO) counter, the value of the OBO counter to o, and randomly selecting, by the STA, i RA-RUs from the k RA-RUs to send uplink data, wherein i≤n, and wherein the first parameter is computed from k and n.

* * * * *

UNITED STATES PATENT AND TRADEMARK OFFICE
CERTIFICATE OF CORRECTION

PATENT NO. : 12,232,187 B2
APPLICATION NO. : 17/686765
DATED : February 18, 2025
INVENTOR(S) : Li et al.

It is certified that error appears in the above-identified patent and that said Letters Patent is hereby corrected as shown below:

In the Claims

In Column 39, in Claim 1, Line 64, delete "k>o," and insert -- k>0, --.

In Column 40, in Claim 1, Line 2, delete "o," and insert -- 0, --.

In Column 40, in Claim 4, Line 19, delete "k1>o," and insert -- k1>0, --.

In Column 40, in Claim 4, Line 23, delete "o," and insert -- 0, --.

In Column 40, in Claim 5, Line 34, delete "m>o," and insert -- m>0, --.

In Column 40, in Claim 6, Line 42, delete "k1>o," and insert -- k1>0, --.

In Column 40, in Claim 6, Line 42, delete "m1>o," and insert -- m1>0, --.

In Column 40, in Claim 6, Line 47, delete "o," and insert -- 0, --.

In Column 40, in Claim 7, Line 58, delete "m>o," and insert -- m>0, --.

In Column 40, in Claim 7, Line 63, delete "o." and insert -- 0. --.

In Column 40, in Claim 8, Line 66, delete "m>o," and insert -- m>0, --.

In Column 41, in Claim 8, Line 6, delete "o." and insert -- 0. --.

In Column 41, in Claim 9, Line 12, delete "o to" and insert -- 0 to --.

In Column 41, in Claim 13, Line 36, delete "RA-RUS," and insert -- RA-RUs, --.

Signed and Sealed this
Twenty-ninth Day of April, 2025

Coke Morgan Stewart
*Acting Director of the United States Patent and Trademark Office*

CERTIFICATE OF CORRECTION (continued)
U.S. Pat. No. 12,232,187 B2

In Column 41, in Claim 14, Line 53, delete "k>o," and insert -- k>0, --.

In Column 41, in Claim 14, Line 55, delete "to o" and insert -- to 0 --.

In Column 42, in Claim 15, Line 13, delete "to o" and insert -- to 0 --.

In Column 42, in Claim 16, Line 20, delete "m>o," and insert -- m>0, --.

In Column 42, in Claim 19, Line 47, delete "k>o," and insert -- k>0, --.

In Column 42, in Claim 19, Line 52, delete "o," and insert -- 0, --.